United States Patent
Jain et al.

(10) Patent No.: US 11,544,179 B2
(45) Date of Patent: Jan. 3, 2023

(54) SOURCE TRACEABILITY-BASED IMPACT ANALYSIS

(71) Applicant: OPSHUB INC., Palo Alto (IN)

(72) Inventors: Sandeep Jain, Palo Alto, CA (US); Vibhuti Bhushan, Bellevue, WA (US); Aparna Garg, Gurgaon (IN)

(73) Assignee: OPSHUB INC.

( * ) Notice: Subject to any disclaimer, the term of this patent is extended or adjusted under 35 U.S.C. 154(b) by 0 days.

(21) Appl. No.: 17/161,243

(22) Filed: Jan. 28, 2021

(65) Prior Publication Data

US 2022/0237108 A1 Jul. 28, 2022

(51) Int. Cl.
*G06F 8/40* (2018.01)
*G06F 11/36* (2006.01)

(52) U.S. Cl.
CPC ............ *G06F 11/3688* (2013.01); *G06F 8/40* (2013.01)

(58) Field of Classification Search
CPC ............. G06F 11/3604; G06F 11/3668; G06F 11/3688; G06F 11/3692
See application file for complete search history.

(56) References Cited

U.S. PATENT DOCUMENTS

| | | | | |
|---|---|---|---|---|
| 8,522,215 | B1 * | 8/2013 | Aldrich | G06F 11/3676 717/124 |
| 11,144,434 | B2 * | 10/2021 | Potter | G06F 11/3676 |
| 2014/0181796 | A1 * | 6/2014 | Singh | G06F 11/3668 717/132 |
| 2017/0371650 | A1 * | 12/2017 | Li | G06F 8/61 |
| 2021/0406001 | A1 * | 12/2021 | Yang | G06F 11/3664 |

OTHER PUBLICATIONS

M. Rath et al., "Traceability in the Wild: Automatically Augmenting Incomplete Trace Links," 2018 IEEE/ACM 40th International Conference on Software Engineering (ICSE), 2018, pp. 834-845. Retrieved from Internet: <URL: https://ieeexplore.ieee.org/stamp/stamp.jsp?tp=&arnumber=8453157>. (Year: 2018).*

* cited by examiner

*Primary Examiner* — Hanh Thi-Minh Bui
(74) *Attorney, Agent, or Firm* — Barry Choobin; Patent 360 LLC

(57) ABSTRACT

A system including an impact analysis engine (IAE) and a method for analyzing impact of changes to a software code are provided. The IAE iteratively processes and compares lines of the software code changed across different versions of the software code for deriving the impact of changes performed for a requested version. The IAE automatically identifies artifacts impacted by changes to each line of the software code across different versions by processing code change data. The code change data includes change data between start and end tags of the software code and commit actions previous to the start tag. The code change data includes unique identifiers of artifacts traced to the commit actions, which allow customized retrieval of artifact data including features, defects, and epics impacted by changes to each line of the software code. The IAE automatically identifies linked elements, for example, tests, traced to the identified artifacts.

18 Claims, 18 Drawing Sheets

| | 1001 |
|---|---|
| Enter Start Tag | 2020Q1190870 |
| Enter End Tag | 2020Q2200245 |
| Enter Scan Depth | 2 |
| Enter Scan Depth Time | 01/01/2020 |

FIG. 10A

```
git diff --name-status start_tag end_tag
M    views/layouts/default.ctp
M    webroot/css/theme.css
A    webroot/img/theme/logo.png
M    core/src/main/java/org/apache/calcite/rex/RexSimplify.java
M    core/src/main/java/org/apache/calcite/sql/fun/SqlTrimFunction.java
A    core/src/main/java/org/apache/calcite/sql2rel/SqlToRelConverter.java
M    core/src/main/java/org/apache/calcite/util/SaffronProperties.java
M    core/src/test/java/org/apache/calcite/test/RexProgramTest.java
A    core/src/test/java/org/apache/calcite/test/SqlToRelConverterTest.java
M    core/src/test/resources/org/apache/calcite/test/SqlToRelConverterTest.xml
M    pom.xml
M    spark/src/main/java/org/apache/calcite/adapter/spark/SparkRules.java
```

FIG. 10B

```
...    ...    @@ -1,6 +1,6 @@
 1      1            Gem::Specification.new do |s|
 2      2              s.name    = 'github-linguist'
 3             -        s.version = '2.2.0'
        3      +        s.version = '2.3.3'
 4      4              s.summary = "GitHub Language detection"
 5      5
 6      6              s.authors = "GitHub"
        @@ -10,8 +10,9 @@ Gem::Specification.new do |s|
10     10
11     11              s.add_dependency 'charlock_holmes', '~> 0.6.6'
12     12              s.add_dependency 'escape_utils',    '~> 0.2.3'
13             -        s.add_dependency 'mime-types',      '~> 1.18'
       13      +        s.add_dependency 'mime-types',      '~> 1.19'
14     14              s.add_dependency 'pygments.rb',     '>= 0.2.13'
       15      +        s.add_development_dependency 'mocha'
15     16              s.add_development_dependency 'json'
16     17              s.add_development_dependency 'rake'
17     18              s.add_development_dependency 'yajl-ruby'
```

| Artifacts_impacted | 1004 |
|---:|---|
| 2134 | |
| 5435 | |
| 567 | |
| 78 | |
| 34 | |
| 67 | |
| 34 | |
| 89 | |
| 3454 | |
| 778 | |
| 234 | |
| 87 | |
| 435 | |

FIG. 10D

| Impact artifact ID | Impacted Artifact Name | Test Case ID | Test Case Name | Test Case Link |
|---|---|---|---|---|
| 213 | LDAP login support for application | | | |
| | | 100 | Invalid credentials test | URL of test case |
| | | 101 | Valid credentials test | URL of test case |
| | | 102 | Empty password test | URL of test case |
| | | Test Case ID | Test Case Name | Test Case Link |
| 214 | SAML login support for application | | | |
| | | 200 | SAML server available test | URL of test case |
| | | 201 | SAML server not available test | URL of test case |
| | | 202 | Delayed response from SAML test | URL of test case |
| | | Test Case ID | Test Case Name | Test Case Link |
| 215 | Default authentication support for application | | | |
| | | 300 | Username too long | URL of test case |
| | | 301 | password too long | URL of test case |
| | | 302 | password expired | URL of test case |
| | | Test Case ID | Test Case Name | Test Case Link |
| 216 | Login API | | | |
| | | 400 | Invalid credentials in login | URL of test case |
| | | 401 | Valid credentials in login | URL of test case |
| | | 402 | Session expired | URL of test case |

FIG. 10E

| Caused by Artifact - Caused by Artifact - Name | | | |
|---|---|---|---|
| 2434 Support for Oauth token | Test Case ID | Test Case Name | Test Case Link |
| | 100 | Invalid credentials test | URL of test case |
| | 101 | Valid credentials test | URL of test case |
| | 102 | Empty password test | URL of test case |
| 2434 Support for Oauth token | Test Case ID | Test Case Name | Test Case Link |
| | 200 | SAML server available test | URL of test case |
| | 201 | SAML server not available test | URL of test case |
| | 202 | Delayed response from SAML test | URL of test case |
| 215 Default authentication support for application | Test Case ID | Test Case Name | Test Case Link |
| | 300 | Username too long | URL of test case |
| | 301 | password too long | URL of test case |
| | 302 | password expired | URL of test case |
| 35454 Handle session expire in application APIs | Test Case ID | Test Case Name | Test Case Link |
| | 400 | Invalid credentials in login | URL of test case |
| | 401 | Valid credentials in login | URL of test case |
| | 402 | Session expired | URL of test case |

FIG. 10F

| Release | Artifact ID | Impacted Artifact Name | Artifact URL |
|---|---|---|---|
| v3.0 | | | |
| | | 100 LDAP login support for application | URL of artifact |
| | | 101 Handle authentication | URL of artifact |
| | | 102 Chip enhancement required | URL of artifact |
| v4.0 | Artifact ID | Impacted Artifact Name | Artifact URL |
| | | 200 Dynamic box required | URL of artifact |
| | | 201 Drop down widget enhancement | URL of artifact |
| | | 202 multiple session support by application | URL of artifact |
| v5.0 | Artifact ID | Impacted Artifact Name | Artifact URL |
| | | 300 Search for user | URL of artifact |
| | | 301 Search for task | URL of artifact |
| | | 302 Reset password | URL of artifact |

FIG. 10G

| Artifact Type | | | |
|---|---|---|---|
| Features | Test Case ID | Test Case Name | Test Case Link |
| | 100 | Invalid credentials test | URL of test case |
| | 101 | Valid credentials test | URL of test case |
| | 102 | Empty password test | URL of test case |
| | 200 | SAML server available test | URL of test case |
| | 201 | SAML server not available test | URL of test case |
| | 202 | Delayed response from SAML test | URL of test case |
| Defects | Test Case ID | Test Case Name | Test Case Link |
| | 300 | Username too long | URL of test case |
| | 301 | password too long | URL of test case |
| | 302 | password expired | URL of test case |
| Issues | Test Case ID | Test Case Name | Test Case Link |
| | 400 | Invalid credentials in login | URL of test case |
| | 401 | Valid credentials in login | URL of test case |
| | 402 | Session expired | URL of test case |

SOURCE TRACEABILITY-BASED IMPACT ANALYSIS

BACKGROUND

Technical Field

The embodiments herein, in general, relate to tracing and analyzing changes to software code. More particularly, the embodiments herein relate to a system and a method for analyzing impact of changes to a software code.

Description of the Related Art

In the software industry, developing or implementing a new feature in a software product or fixing a software bug in a software code of the software product typically leads to regression of at least one feature that was working prior to changes that were made to the software code in a current release. Typical software development processes utilize iterative software development methodologies such as the Agile methodology that supports continuous iteration of development and testing throughout a software development lifecycle of a project and produces multiple releases at predetermined time intervals. A significant amount of time is spent in minimizing regression by performing additional reviews of the software code and better testing, and in fixing regressions in subsequent releases. When a change executed for a given backlog or an artifact impacts other features or artifacts, it is difficult to identify the features or artifacts that are impacted. The identification of the impacted features and artifacts becomes more complex when multiple teams are working on the same features or the same team is working on multiple features.

To ensure that there is no ripple effect, there is a need for testing not only the code that is changed but also other artifacts that may be impacted before releasing an update or a release to a customer. Some conventional systems separate feature-wise code completely to remove any dependency. However, this separation results in code duplicity and significantly increases the scope of testing because multiple copies need to be tested separately. As it is not feasible to separate code for individual features, developers rely on extensive documentation of the code and the features represented by the code. This approach, however, is dependent on obtaining proper documentation from a developer and deriving the right features to be tested based on the documentation. Moreover, this approach is manual and is prone to individual and/or collective mistakes. The quality of the code is dependent on multiple people across different teams executing different aspects of software development, for example, coding, documentation, testing, etc., without errors.

Other conventional systems map features to modules in a source code. When there is a change in any file in any of these modules, these systems pick the mapped feature for impact testing. This approach covers only features that are impacted and fails to uncover other types of backlog, for example, defects, stories, tasks, etc. Moreover, this approach relies on proper documentation or a developer's knowledge of module association with different features. To ensure that there is no regression, this approach leads to over testing as each module contains multiple files and even if the changes were made in distinct files, each feature is tagged as impacted, resulting in a massive list of test plans to be tested. With this approach, it is impractical and not feasible to test this massive list of test plans. To reduce over testing, the list of test plans is typically minimized by a judgement call that determines which features will be less impacted, resulting in compromised regression testing. The above approaches do not identify all the impacted artifacts, which in turn, results in regression.

Hence, there is a long-felt need for a system and a computer-implemented method for comprehensively analyzing impact of changes to a software code, while addressing the above-recited problems associated with the related art.

OBJECTS OF THE EMBODIMENTS HEREIN

An object of the embodiments disclosed herein is to provide a system and a computer-implemented method for comprehensively analyzing impact of changes to a software code.

Another object of the embodiments disclosed herein is to retrieve and process code change data from at least one of a plurality of data sources for comprehensively analyzing impact of changes to a software code.

Another object of the embodiments disclosed herein is to automatically identify a plurality of artifacts impacted by changes to each line of a software code across different versions of the software code, without user intervention.

Another object of the embodiments disclosed herein is to automatically identify linked elements, for example, tests, features, epics, other linked artifacts, etc., traced to the identified artifacts.

Another object of the embodiments disclosed herein is to perform a deep impact analysis based on lines of the software code changed by different artifacts.

Another object of the embodiments disclosed herein is to generate and render an impact analysis report comprising customizable information related to the identified artifacts and the identified linked elements at a plurality of levels on a computing device.

The objects disclosed above will be realized and achieved at least by the elements, features, and combinations particularly pointed out in the claims. The objects disclosed above have outlined, rather broadly, the features of the embodiments disclosed herein in order that the detailed description that follows is better understood. The objects disclosed above are not intended to determine the scope of the claimed subject matter and are not to be construed as limiting of the embodiments disclosed herein. Additional objects, features, and advantages of the embodiments herein are disclosed below. The objects disclosed above, which are believed to be characteristic of the embodiments disclosed herein, both as to its organization and method of operation, together with further objects, features, and advantages, will be better understood and illustrated by the technical features broadly embodied and described in the following description when considered in connection with the accompanying drawings.

SUMMARY

This summary is provided to introduce a selection of concepts in a simplified form that are further disclosed in the detailed description. This summary is not intended to determine the scope of the claimed subject matter.

The embodiments disclosed herein address the above-recited need for a system and a computer-implemented method for comprehensively analyzing impact of changes to a software code. The embodiments herein perform a deep impact analysis by comparing lines changed across different software code versions for deriving the impact of changes performed for given version. The embodiments herein uncover artifacts that are impacted and other types of backlog, for example, defects, stories, tasks, etc. The system disclosed herein comprises an impact analysis engine configured to define computer program instructions executable by at least one processor for comprehensively analyzing impact of changes to a software code. The system disclosed herein further comprises a non-transitory, computer-readable storage medium, for example, a memory unit, operably and communicatively coupled to the processor(s) and configured to store the computer program instructions executable by the processor(s). In the computer-implemented method disclosed herein, the impact analysis engine retrieves code change data from at least one of multiple data sources. The data sources comprise, for example, one or more of source control management (SCM) systems, application lifecycle management (ALM) systems, quality assurance (QA) systems, requirements management systems, etc. For example, the impact analysis engine retrieves the code change data from an SCM system. In an embodiment, the retrieved code change data comprises (a) change data between a first tag element and a second tag element of the software code, and (b) commit actions previous to the first tag element associated with the change data. The retrieved code change data further comprises unique identifiers of artifacts traced to the commit actions.

In an embodiment, the impact analysis engine retrieves the code change data from at least one of the data sources by automatic execution of one or more commands associated with at least one of the data sources. In another embodiment, the impact analysis engine retrieves the code change data from at least one of the data sources based on user input data received via one or more of multiple input channels, for example, a graphical user interface (GUI), a script, an application programming interface (API), etc. The user input data defines a scope for the retrieval of the code change data from at least one of the data sources. The user input data comprises, for example, a start tag element, an end tag element, a depth element, and a time element.

The impact analysis engine automatically identifies multiple artifacts impacted by changes to each line of the software code across different versions of the software code by processing the retrieved code change data using another data source, for example, an ALM system. The unique identifiers of the artifacts in the retrieved code change data are configured to allow customized retrieval of one or more artifact data sets comprising detailed information of the artifacts, for example, from the ALM system. The detailed information of the artifacts comprises, for example, features, defects, and epics impacted by the changes to each line of the software code. In an embodiment, the impact analysis engine processes the retrieved code change data by iteratively processing and comparing lines of the software code changed across the different versions of the software code for deriving the impact of the changes performed for a requested version of the software code. The impact analysis engine automatically identifies multiple linked elements, for example, tests, features, epics, other linked artifacts, etc., traced to the identified artifacts using the linkage information, for example, artifacts-tests linkage information, retrieved from another data source, for example, the QA system. During the automatic identification of the linked elements traced to the identified artifacts, the impact analysis engine retrieves one or more linked element data sets comprising detailed information of the linked elements traced to the identified artifacts from another data source, for example, the QA system. The impact analysis engine stores the retrieved code change data, one or more artifact data sets corresponding to the identified artifacts, and one or more linked element data sets traced to the identified artifacts in a database, for example, a relational database or a non-relational database, and/or in the non-transitory, computer-readable storage medium, for example, a memory unit. The impact analysis engine generates and renders an impact analysis report comprising customizable information related to the identified artifacts and the identified linked elements at multiple levels on a computing device. In an embodiment, the impact analysis engine groups and renders the customizable information related to the identified artifacts and the identified linked elements at multiple levels by configurable fields on the computing device.

In one or more embodiments, related systems comprise circuitry and/or programming for executing the methods disclosed herein. The circuitry and/or programming are of any combination of hardware, software, and/or firmware configured to execute the methods disclosed herein depending upon the design choices of a system designer. In an embodiment, various structural elements are employed depending on the design choices of the system designer.

BRIEF DESCRIPTION OF THE DRAWINGS

The foregoing summary, as well as the following detailed description, is better understood when read in conjunction with the appended drawings. For illustrating the embodiments herein, exemplary constructions of the embodiments are shown in the drawings. However, the embodiments herein are not limited to the specific components and methods disclosed herein. The description of a component or a method step referenced by a numeral in a drawing is applicable to the description of that component or method step shown by that same numeral in any subsequent drawing herein.

FIGS. 10A-10H illustrate exemplary screenshots showing input data received and output data rendered by the impact analysis engine during a comprehensive analysis of impact of changes to a software code, according to an embodiment herein.

The specific features of the embodiments herein are shown in some drawings and not in others for convenience only as each feature may be combined with any or all of the other features in accordance with the embodiments herein.

DETAILED DESCRIPTION

Various aspects of the present disclosure may be embodied as a system, a method, or a non-transitory, computer-readable storage medium having one or more computer-readable program codes stored thereon. Accordingly, various embodiments of the present disclosure may take the form of an entirely hardware embodiment, an entirely software embodiment comprising, for example, microcode, firmware, software, etc., or an embodiment combining software and hardware aspects that may be referred to herein as a "system", a "module", an "engine", a "circuit", or a "unit".

Figure 1:
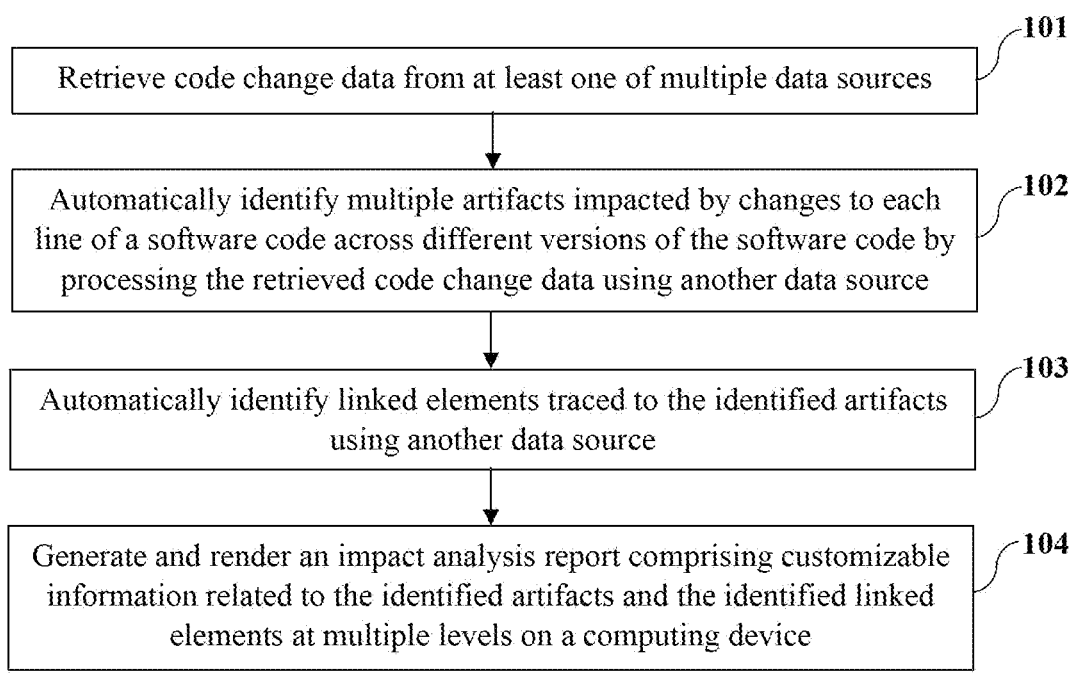
FIG. 1 illustrates a computer-implemented method for comprehensively analyzing impact of changes to a software code, according to an embodiment herein.

FIG. 1 illustrates a computer-implemented method for comprehensively analyzing impact of changes to a software code, according to an embodiment herein. The method disclosed herein employs an impact analysis engine configured to define computer program instructions executable by at least one processor for comprehensively analyzing the impact of changes to a software code. In the computer-implemented method disclosed herein, the impact analysis engine retrieves 101 code change data from at least one of multiple data sources. The data sources comprise, for example, one or more of Source Control Management (SCM) systems, Application Lifecycle Management (ALM) systems, Quality Assurance (QA) systems, requirements management systems, etc. For example, the impact analysis engine retrieves the code change data from an SCM system.

In an embodiment, the retrieved code change data comprises a first data set comprising change data between a first tag element and a second tag element of the software code. The tag elements refer to point-in-time labels pointing to a particular repository history state. In a software cycle, a tag is created at a start or beginning point or an end point of each release of the software code. The first data set, therefore, comprises all files and lines touched between two tags, that is, a start tag and an end tag, of the software code. That is, the first data set comprises all changes performed between two given commit actions, also referred to as "commits" or between two history points in a repository. Commit actions are actions that make the changes to the software code permanent.

The retrieved code change data further comprises a second data set comprising commit actions previous to the first tag element associated with the change data. For example, the second data set comprises commits actions performed previous to a given tag element that also touched the same lines of the software code. The second data set provides an identification of a parent commit that touched a given line in a given file before a given commit. A parent commit is a commit performed before a given commit. The retrieved code change data further comprises a third data set comprising unique identifiers (ids) of artifacts traced to the commit actions, that is, artifacts against which a commit action was performed. As used herein, "artifacts" refer to elements, for example, stories, features, defects, epics, etc., in a software development project. The retrieved code change data, therefore, comprises artifact and commit linkage information. The impact analysis engine stores the retrieved code change data in a database for example, a relational database or a non-relational database, and/or in a non-transitory, computer-readable storage medium, for example, a memory unit, of a computing device.

In an embodiment, the impact analysis engine retrieves the code change data from at least one of the data sources by automatic execution of one or more commands associated with at least one of the data sources. For example, the impact analysis engine retrieves all files and lines touched between two tags from an SCM system or an SCM tool using a difference (diff) command or a diff-like command in the SCM tool and generates the first data set. Execution of the diff command between two commits or tags, outputs all files that were touched between two tags, while execution of the diff command between two files compares file text and outputs the difference between the file text in the two files.

In another example, the impact analysis engine identifies a previous commit action that touched the same lines of the software code by automatic execution of built-in commands of SCM tools and generates the second data set. The impact analysis engine identifies a previous commit action that touched the same line of the software code, for example, using a "p4 annotate" command of Perforce Software Inc., "git blame" command of GitHub, Inc., "svn blame" of Apache Subversion, "annotate" of Team Foundation Server (TFS) version control of Microsoft Corporation, etc. For example, the impact analysis engine uses the git blame command such as "git blame-L2 commit_idA—"file1"" to identify a parent commit that previously touched line 2 in file 1. If any SCM tool does not contain a blame-like command or an annotate-like command, then the impact analysis engine derives a previous commit that touched the same line of the software code by fetching all old commits on a given file and scanning lines touched by each commit or a log of each commit to identify the last commit that touched a given line.

In another example, the impact analysis engine fetches artifact and commit linkage information and generates the third data set by parsing a commit message of every commit performed in the SCM system that touched the same line as touched between the first tag element and the second tag element. In another example, the impact analysis engine fetches artifact and commit linkage information from commit linkage if commits and artifacts are in the same system or from a pull request (PR) traced to a commit in case an artifact is traced to the pull request. For fetching artifact identifiers from a commit message, the artifact identifier must be defined against the commit that is occurring in the commit message at the time of the commit. In an embodiment, the impact analysis engine retrieves the code change data from at least one of the data sources based on user input data received via one or more of multiple input channels, for example, graphical user interface (GUIs), scripts, application programming interfaces (APIs) etc., on a computing device. The user input data defines a scope for the retrieval of the code change data from at least one of the data sources as disclosed in the detailed descriptions of FIGS. 2-4B. The user input data comprises, for example, a start tag element, an end tag element, a depth element, and a time element.

Figure 2:
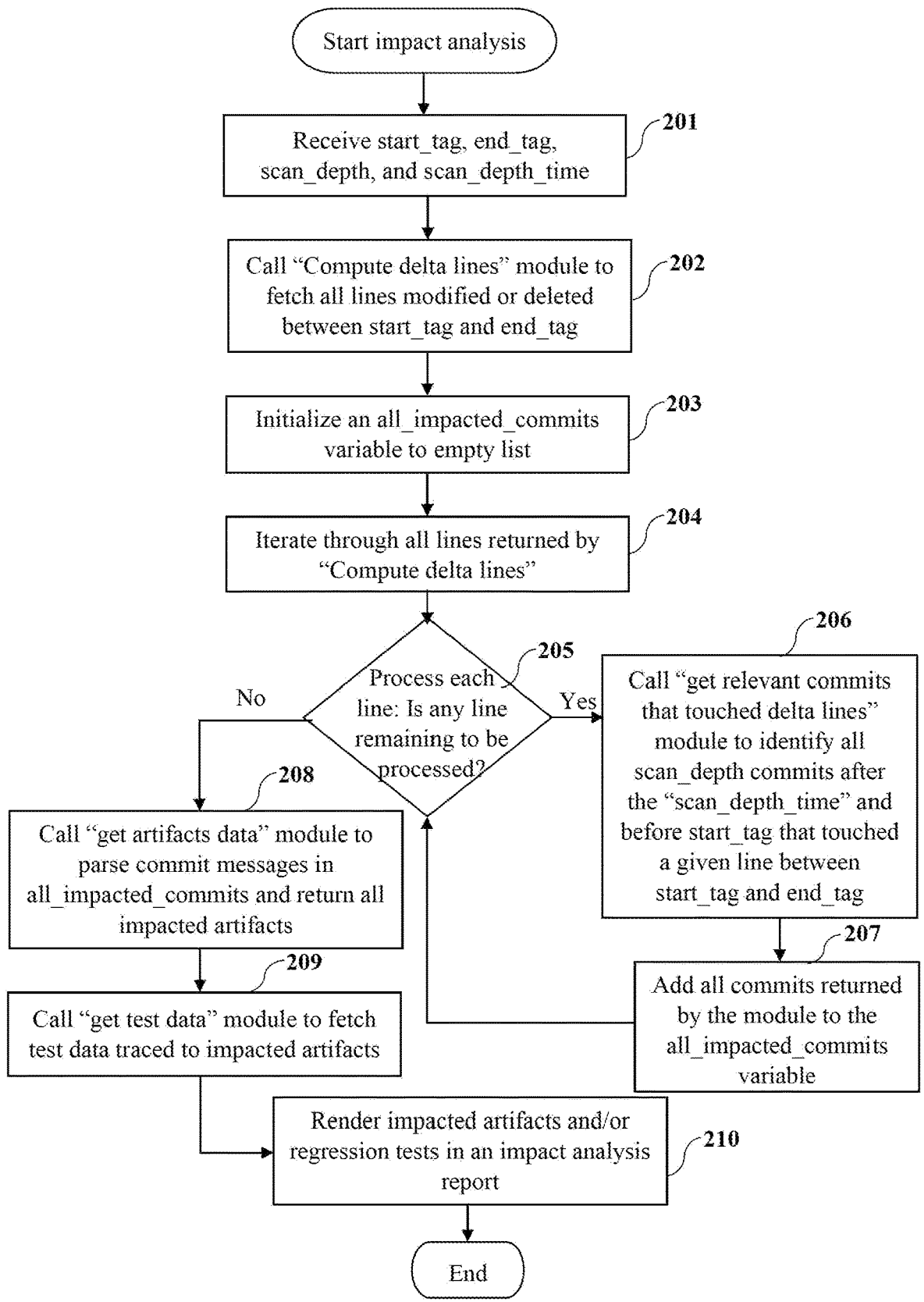
FIG. 2 illustrates a flowchart of an exemplary implementation of the computer-implemented method for comprehensively analyzing impact of changes to a software code, according to an embodiment herein.
Figure 5:
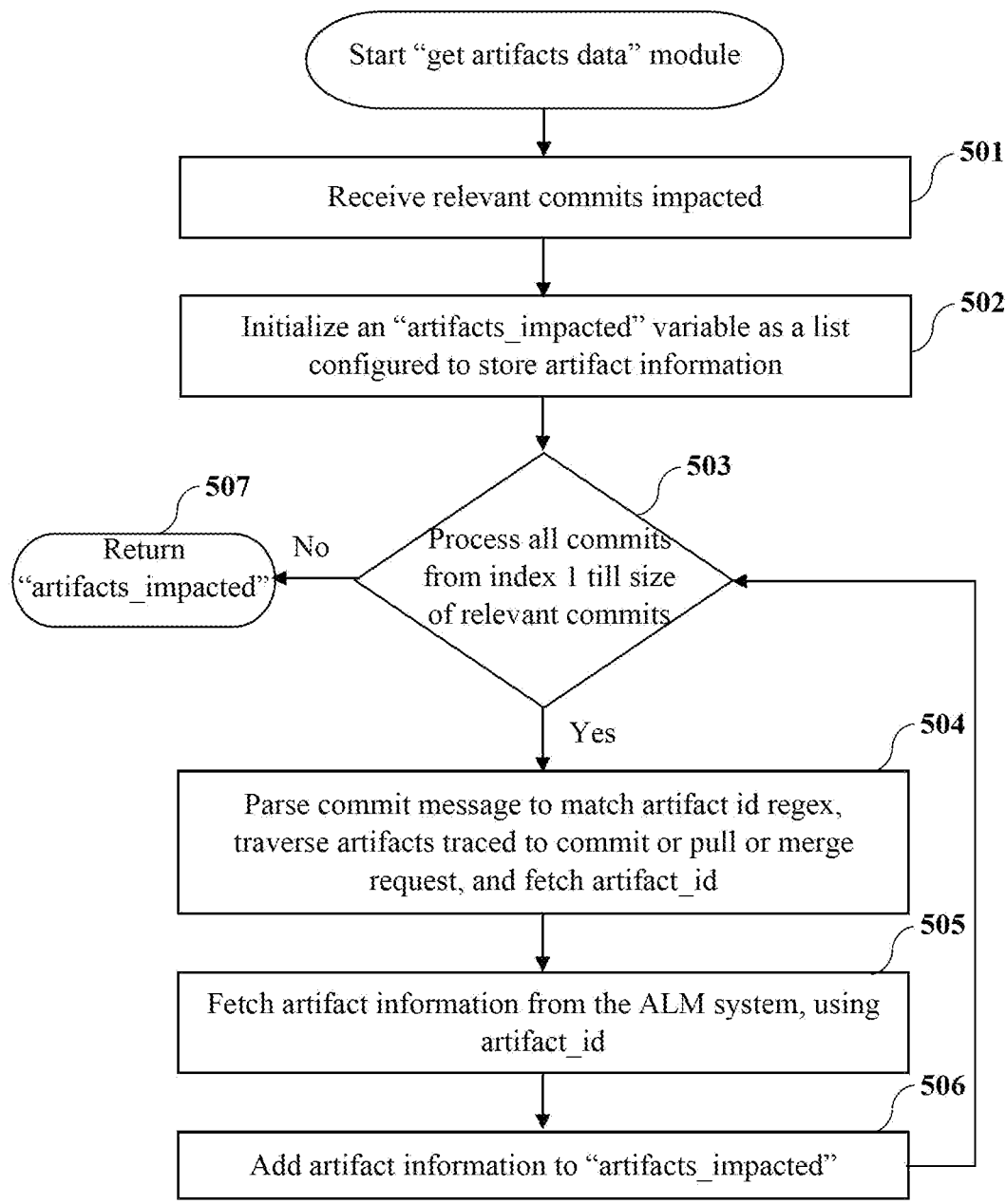
FIG. 5 illustrates a flowchart of a computer-implemented method for retrieving data sets comprising artifacts traced to the commit actions and detailed information of the identified artifacts, according to an embodiment herein.

The impact analysis engine automatically identifies 102 multiple artifacts impacted by changes to each line of the software code across different versions of the software code by processing the retrieved code change data using another data source, for example, an ALM system, as disclosed in the detailed descriptions of FIG. 2 and FIG. 5. Examples of ALM tools of the ALM systems comprise Jira® of Atlassian Pty Ltd., Rally Software® of Broadcom Inc., Azure® DevOps of Microsoft Corporation, etc. The unique identifiers of the artifacts in the retrieved code change data are configured to allow customized retrieval of one or more artifact data sets comprising detailed information of the artifacts, for example, from the ALM system. The detailed information of the artifacts comprises, for example, stories, features, defects, epics, etc., impacted by the changes to each line of the software code. The detailed information of the artifacts further comprises, for example, title, assignee, a parent artifact id, type, etc., of each of the identified artifacts. In an embodiment, the impact analysis engine stores the artifact data set(s) in a database, for example, a relational database or a non-relational database, and/or in a non-transitory, computer-readable storage medium, for example, a memory unit, of a computing device. In an embodiment, the impact analysis engine processes the retrieved code change data by iteratively processing and comparing lines of the software code changed across the different versions of the software code for deriving the impact of the changes performed for a requested version of the software code.

Figure 6:
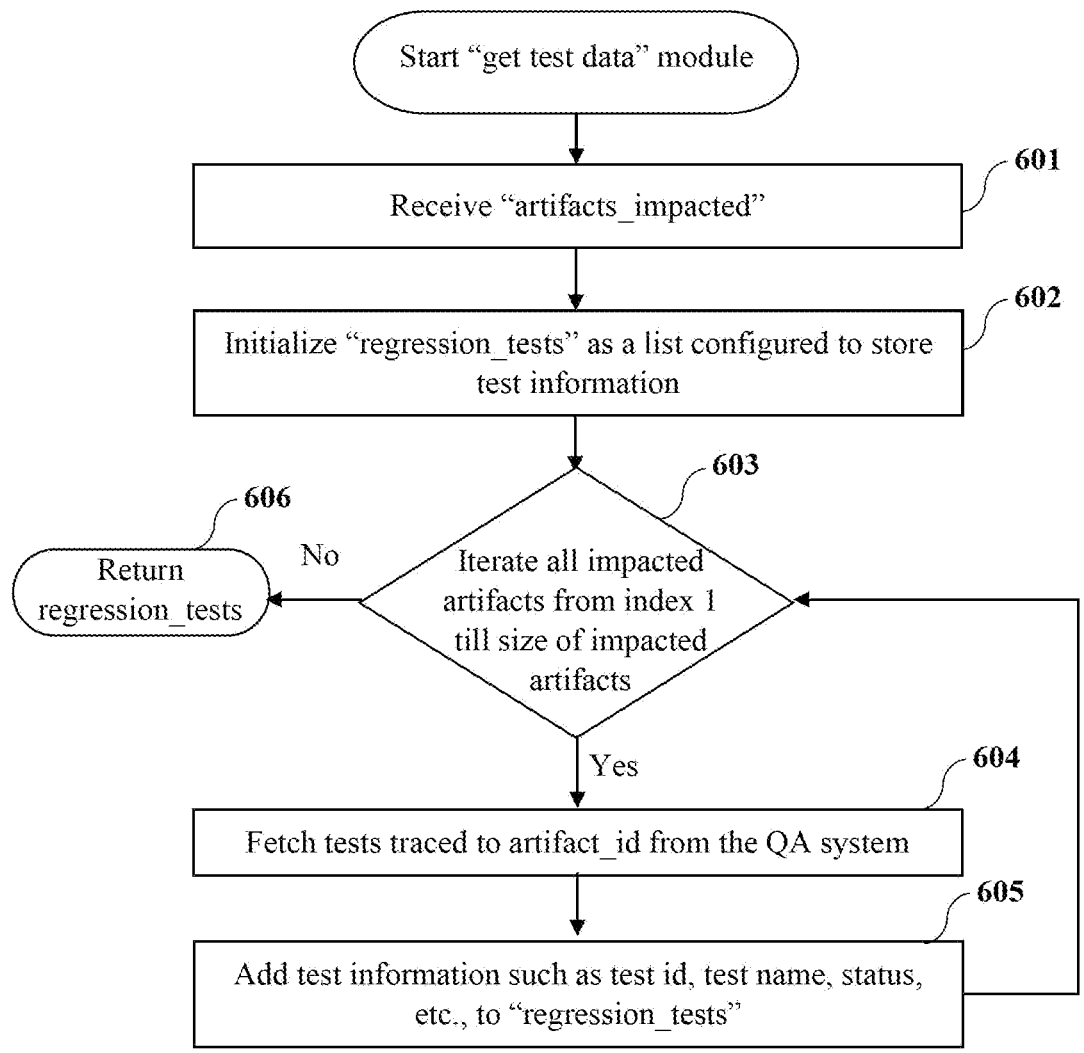
FIG. 6 illustrates a flowchart of a computer-implemented method for retrieving a data set comprising detailed information of tests traced to the identified artifacts, according to an embodiment herein.

In an embodiment, the impact analysis engine automatically identifies 103 multiple linked elements, for example, tests, features, epics, other linked artifacts, etc., traced to the identified artifacts using linkage information retrieved from another data source, for example, a QA system, as disclosed in the detailed descriptions of FIG. 2 and FIG. 6. For linked elements such as tests traced to the identified artifacts, for example, the impact analysis engine identifies test cases that need to be executed for artifacts that are impacted by code changes in a release. During the automatic identification of the tests traced to the identified artifacts, the impact analysis engine retrieves one or more test data sets comprising detailed information of the tests traced to the identified artifacts from another data source, for example, the QA system. Examples of QA tools of the QA systems comprise Micro Focus® ALM/Quality Center, qTest® test management tool of QASymphony LLC, TestRail® test management tool of Gurock Software GmbH LLC, etc. The detailed information of the tests comprises, for example, a test identifier, a test name, an artifact identifier for which a given test is planned, etc., of each of the tests traced to the identified artifacts. In an embodiment, the impact analysis engine stores the linked element data set(s) corresponding to the linked elements traced to the identified artifacts in a database and/or in a non-transitory, computer-readable storage medium of a computing device. For example, the impact analysis engine stores test data set(s) traced to the identified artifacts in a relational database or a non-relational database, and/or in a memory unit of a computing device.

In an embodiment, the impact analysis engine generates and renders 104 an impact analysis report comprising customizable information related to the identified artifacts and the identified linked elements, for example, the tests traced to the identified artifacts, at multiple levels on a computing device. In an embodiment, the impact analysis engine renders the impact analysis report through one or more output channels, for example, a GUI, a spreadsheet, etc. In another embodiment, the impact analysis engine renders the impact analysis report directly to a database. In an embodiment, the impact analysis engine groups and renders the customizable information related to the identified artifacts and the identified linked elements at multiple levels by configurable fields on the computing device as disclosed in the detailed description of FIGS. 10E-10H. In various embodiments, the impact analysis engine renders the results of the impact analysis performed directly to a database, for example, a local database of the impact analysis engine or an end system database such as an SCM system database, an ALM system database, or a QA system database. In other embodiments, the impact analysis engine renders the results of the impact analysis performed to a user via a user interface or returns the results via an API.

For purposes of illustration, the detailed description refers to input channels and output channels, for example, GUIs, scripts, APIs, etc., for receiving user input data and rendering the impact analysis output results, for example, the impact analysis report(s), respectively; however the scope of the system and the computer-implemented method disclosed herein is not limited to the input channels and output channels disclosed herein, but may be extended to include any type of input channel and output channel for receiving the user input data and rendering the impact analysis output results respectively.

FIG. 2 illustrates a flowchart of an exemplary implementation of the computer-implemented method for comprehensively analyzing impact of changes to a software code, according to an embodiment herein. The impact analysis engine is configured to define computer program instructions of the following impact analysis algorithm for comprehensively analyzing impact of changes to a software code. The impact analysis engine receives 201 user input data, for example, start_tag, end_tag, scan_depth, and scan_depth_time entered by a user via one or more input channels on a computing device. The user input data element "start_tag" refers, for example, to a source control management (SCM) tag name denoting a point-in-time since when a user wants to scan code changes for identifying impacted artifacts. The user input data element "end_tag" refers, for example, to an SCM tag name denoting a point-in-time till when the impact analysis engine must scan code changes for identifying impacted artifacts. The "start_tag" is created before the "end_tag" is created. The impact analysis engine is configured to scan all code changes performed between "start_tag" and "end_tag," to identify the impacted artifacts. The user input data element "scan_depth" refers to a number of commits to be scanned on every changed line. For example, if a user inputs a "scan_depth" of 1, then for every line touched between "start_tag" and "end_tag", the impact analysis engine scans one previous commit on that file on the same line. In another example, if the user inputs a "scan_depth" of 2, then the impact analysis engine scans the last commit and last—1 commit on the same line. In an embodiment, "scan_depth" is configured to be 1 or greater than 1. The user input data element "scan_depth_time" refers to a time till when the impact analysis engine must analyze previous commits on every line touched between "start_tag" and "end_tag". The impact analysis engine scans every touched line for the number of commits defined by "scan_depth", unless a commit that was performed before "scan_depth_time" is present. If a commit that was performed before "scan_depth_time" is present, the impact analysis engine discontinues the scanning for a given line. If the number of commits defined by "scan_depth" occurs before "scan_depth_time", then the impact analysis engine processes the number of commits defined by "scan_depth". The user input data is transformed, processed, and executed by the impact analysis algorithm in the impact analysis engine for comprehensively analyzing impact of changes to a software code as follows.

On receiving the user input data comprising the "start_tag", the "end_tag", the "scan_depth", and the "scan_depth_time", the impact analysis engine calls various sub-modules to generate the end result of automatically identifying linked elements, for example, tests, traced to identified artifacts using code change data. In this exemplary implementation, the sub-modules comprise a "compute delta lines" module, a "get relevant commits that touched delta lines" module, a "get artifacts data" module, and a "get test data module" as disclosed in the detailed descriptions of FIGS. 3A-3B, FIGS. 4A-4B, FIG. 5, and FIG. 6 respectively. The impact analysis engine calls 202 the "compute delta lines" module for fetching all lines modified or deleted in all files modified, renamed, or deleted between the "start_tag" and the "end_tag". The impact analysis engine initializes 203 an "all_impacted_commits" variable to an empty list. The impact analysis engine iterates 204 through each line returned by the "compute delta lines" module. The impact analysis engine proceeds to process each line and determines 205 whether any line is remaining to be processed. If there are remaining lines to be processed, the impact analysis engine calls 206 the "get relevant commits that touched delta lines" module for finding and identifying all "scan_depth" commits after "scan_depth_time" and before the "start_tag" that touched a given line between the "start_tag" and the "end_tag". The "get relevant commits that touched delta lines" module is herein referred to as the "get relevant commits" module. The impact analysis engine adds 207 all commits returned by the "get relevant commits" module to the "all_impacted_commits" variable and proceeds to step 205. If there are no remaining lines to be processed, the impact analysis engine calls 208 the "get artifacts data" module. The "get artifacts data" module receives the commits returned by the "get relevant commits" module, parses each commit in the "all_impacted_commits" variable to fetch an artifact identifier (id) against which the commit was performed, and then retrieves detailed information of the impacted artifacts from the application lifecycle management (ALM) system. The impact analysis engine then calls 209 the "get test data" module. The "get test data" module receives the detailed information of the impacted artifacts returned by the "get artifacts data" and retrieves test data traced to the impacted artifacts from the quality assurance (QA) system. The impact analysis engine fetches output data comprising the detailed information of the impacted artifacts from the "get artifacts data" module and the detailed information of the tests that are traced to those artifacts from the "get test data" module and renders 210 an impact analysis report comprising the impacted artifacts and/or the tests.

Figure 3A:
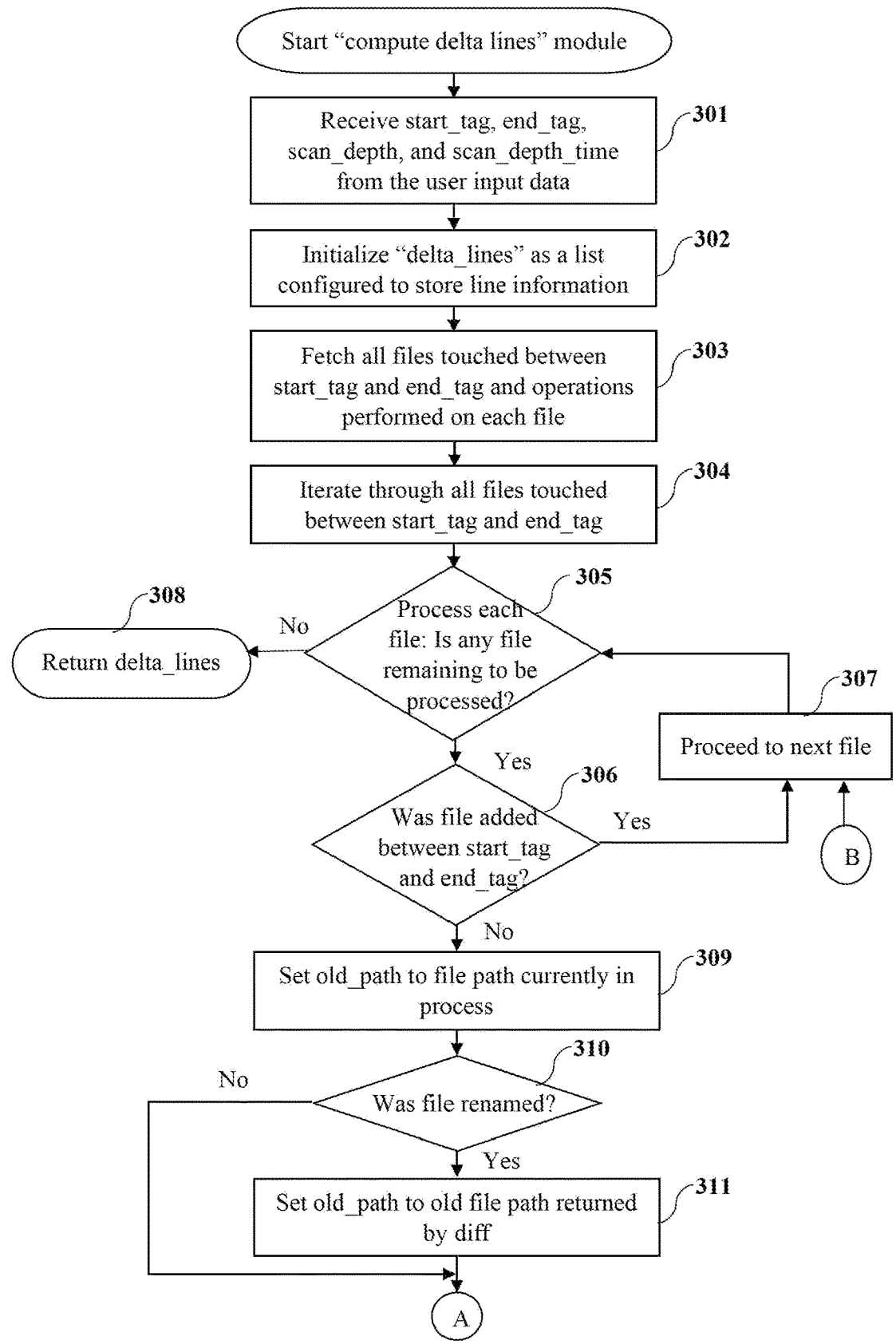
FIGS. 3A-3B illustrate a flowchart of a computer-implemented method for retrieving a data set comprising change data between a first tag element and a second tag element of the software code, according to an embodiment herein.
Figure 3B:
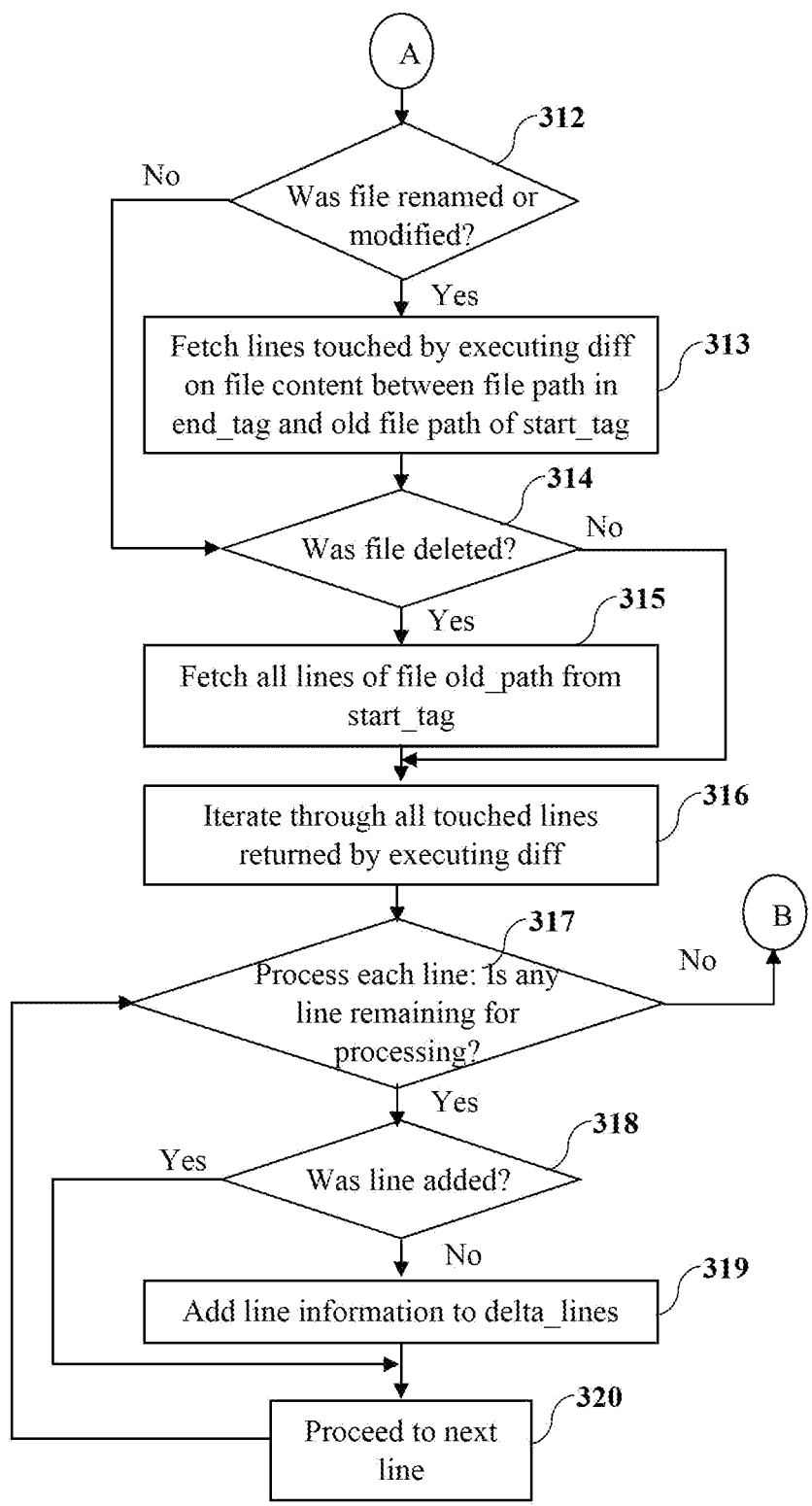

FIGS. 3A-3B illustrate a flowchart of a computer-implemented method for retrieving a data set comprising change data between a first tag element and a second tag element of the software code, according to an embodiment herein. The first tag element is the "start_tag" and the second tag element is the "end_tag" received from the user input data as disclosed in the detailed description of FIG. 2. The impact analysis engine calls the "compute delta lines" module for retrieving the data set comprising change data between the "start_tag" and the "end_tag" of the software code. The "compute delta lines" module fetches all lines modified or deleted in all files modified, renamed, or deleted between the "start_tag" and the "end_tag", The "compute delta lines" module receives the "start_tag" and the "end_tag" as input and returns delta lines between the "start_tag" and the "end_tag" in accordance with the following algorithm:

(1) Fetch all files touched and operations such as added, renamed, modified, and deleted, performed on each file between the "start_tag" and the "end_tag" from a source control management (SCM) system using a p4 diff2 or git diff equivalent command.

(2) Initialize a "delta_lines" variable as an array of line information.

(3) Iterate through all files touched between the "start_tag" and the "end_tag".

(3.1) Skip any further processing if the operation performed on the file was "added".

(3.2) Set an "old_path" variable to file path in repository.

(3.3) If the file was renamed, set the "old_path" variable to old path returned by executing the diff command at step (1). Most SCM systems return an old path of the file as part of the diff command output, if the file is renamed.

(3.4) If the file is renamed or modified, then execute the diff command on the file between the old path in the "start_tag" and the file path in the "end_tag" showing all lines that were touched along with their respective line numbers and operations performed, for example, added, modified, or deleted, on each touched line between the "start_tag" and the "end_tag".

(3.5) If the file was deleted, then fetch all lines of the file from the old path in the "start_tag".

(3.6) Iterate through all touched lines returned by executing the diff command on the file:

(3.6.1) Skip this line and proceed to the next line if the line operation defined in a "line_operation" variable is "added".

(3.6.2) Add line information such as line number, operation performed on a line, file name, file path, and operation performed on the file to the "delta_lines" variable.

(4) Return the "delta lines" variable.

As illustrated in FIGS. 3A-3B, the "compute delta lines" module receives 301 the "start_tag", the "end_tag", and "scan_depth_time" from the user input data and initializes 302 a "delta_lines" variable as a list configured to store line information as an array. The "compute delta lines" module fetches 303 all files touched between the "start_tag" and the "end_tag" and operations, for example, added, renamed, modified, deleted, etc., performed on each file from the SCM system, for example, using a p4 diff2 or git diff equivalent command. The "compute delta lines" module iterates 304 through all files touched between the "start_tag" and the "end_tag". The "compute delta lines" module proceeds to process each file and determines 305 whether there is any file remaining to be processed. If there is a file remaining to be processed, the "compute delta lines" module determines 306 whether the file was added between the "start_tag" and the "end_tag". If the file was added between the "start_tag" and the "end_tag", the "compute delta lines" module proceeds 307 to the next file and then to step 305. If there is no file remaining to be processed, the "compute delta lines" module returns 308 the "delta_lines" variable containing all lines modified or deleted in all files modified, renamed, or deleted between the "start_tag" and the "end_tag".

If the file was not added between the "start_tag" and the "end_tag", the "compute delta lines" module sets 309 an "old_path" variable to a file path currently in process. The "compute delta lines" module then determines 310 whether the file was renamed. If the file was renamed, the "compute delta lines" module sets 311 the "old_path" variable to an old file path returned by a diff command and proceeds to step 312. If the file was not renamed, the "compute delta lines" module directly proceeds to step 312. At step 312, the "compute delta lines" module determines whether the file was renamed or modified. If the file was renamed or modified, the "compute delta lines" module fetches 313 lines touched by executing a diff command on file content between the file path in the "end_tag" and the old file path in the "start_tag". The "compute delta lines" module then determines 314 whether the file was deleted. If the file was not renamed or modified, the "compute delta lines" module directly proceeds to determine 314 whether the file was deleted. Furthermore, if the file was deleted, the "compute delta lines" module fetches 315 all lines of the file in the "old_path" variable from the "start_tag". Furthermore, if the file was not deleted, the "compute delta lines" module directly proceeds to step 316. At step 316, the "compute delta lines" module iterates through all the touched lines returned by executing the diff command. The "compute delta lines" module then proceeds to process each line and determines 317 whether there is any line remaining for processing. If there is a line remaining for processing, the "compute delta lines" module determines 318 whether the line was added. If the line was added, the "compute delta lines" module proceeds 320 to the next line and then proceeds to step 317. If the line was not added, the "compute delta lines" module adds 319 details of the line, herein referred to as "line information" to the "delta_lines" variable, proceeds 320 to the next line, and then proceeds to step 317. If there is no line remaining for processing, the "compute delta lines" module proceeds to step 307, repeats the process until there is no file remaining to be processed, and then returns 308 the delta_lines variable containing all lines modified or deleted in all files modified, renamed, or deleted between the "start_tag" and the "end_tag".

Figure 4A:
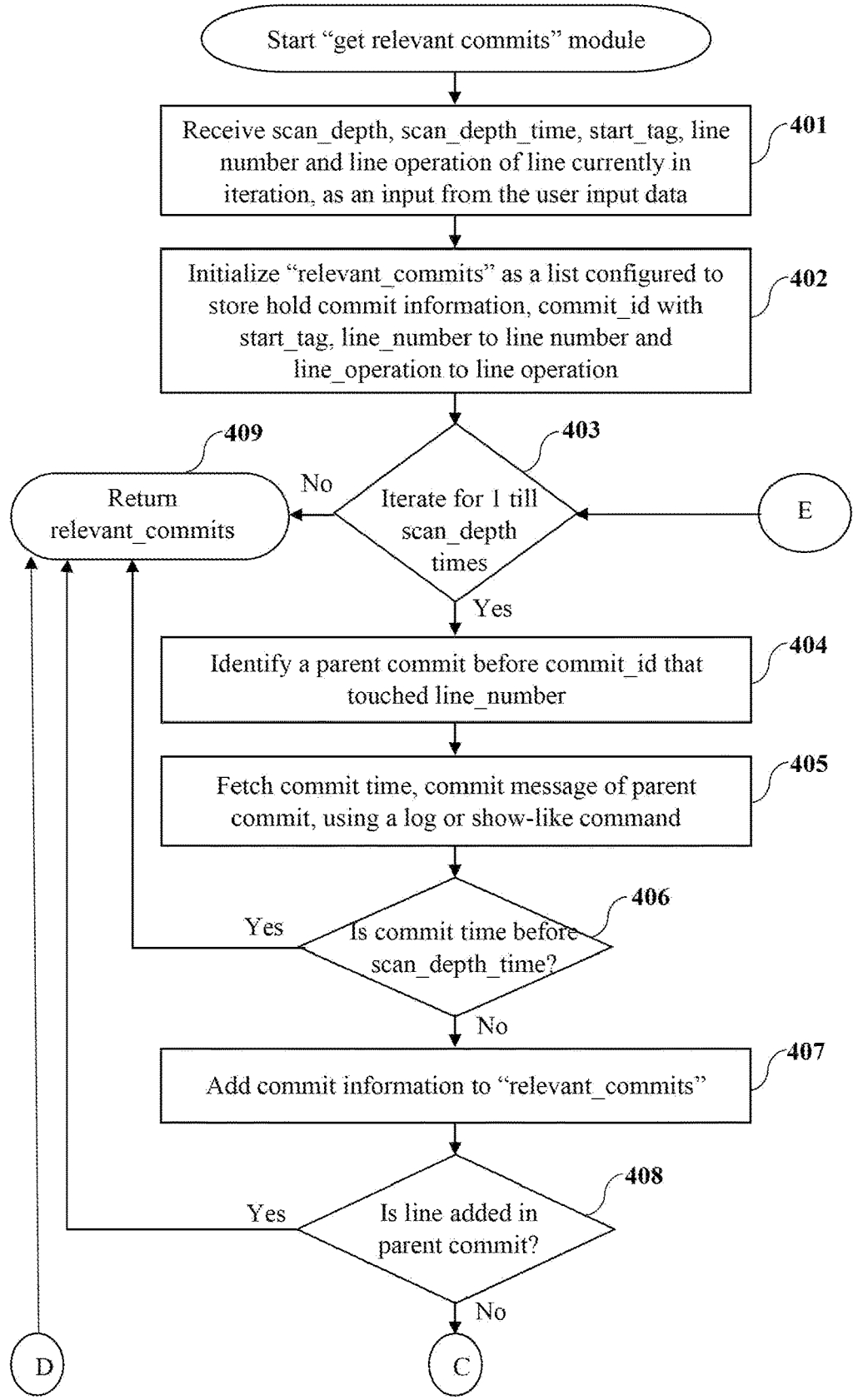
FIGS. 4A-4B illustrate a flowchart of a computer-implemented method for retrieving a data set comprising commit actions previous to the first tag element associated with the change data, according to an embodiment herein.
Figure 4B:
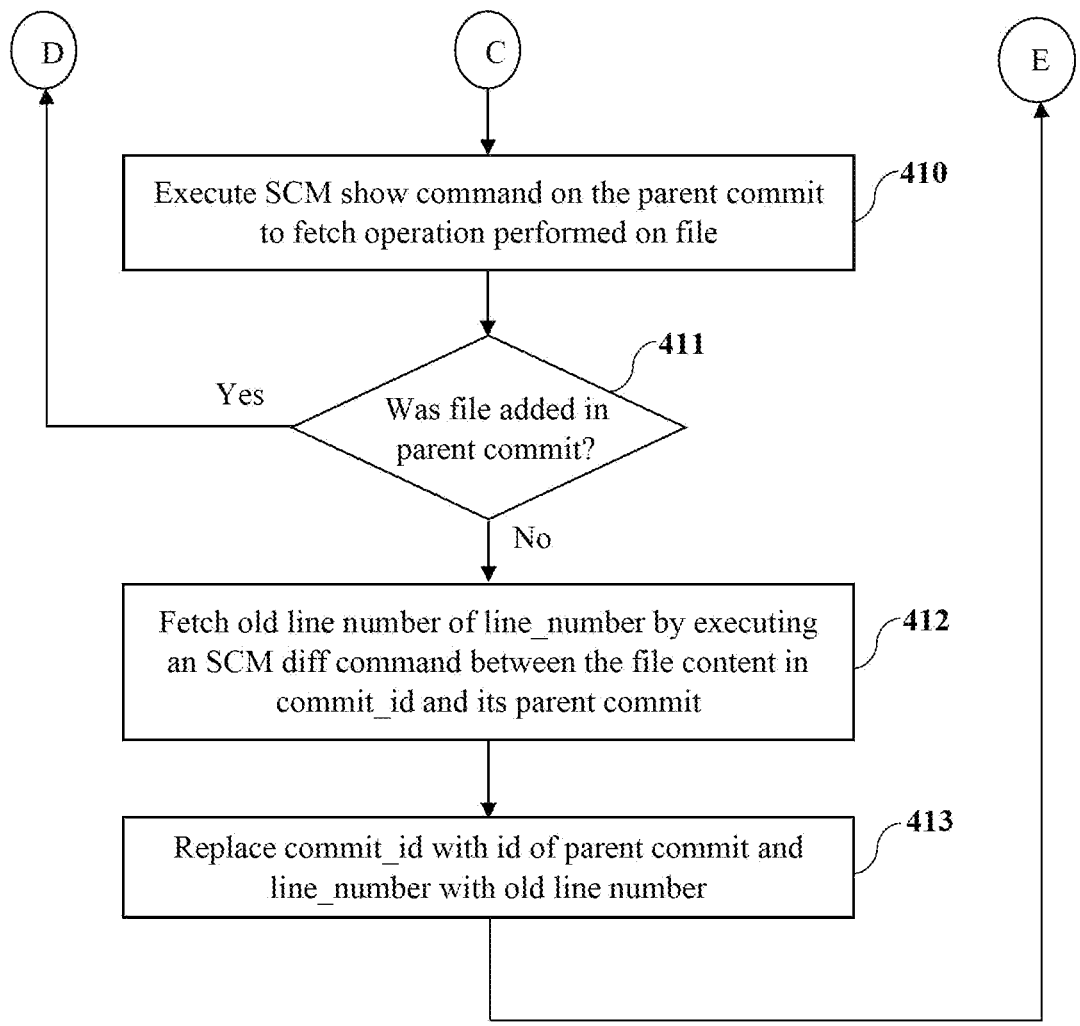

FIGS. 4A-4B illustrate a flowchart of a computer-implemented method for retrieving a data set comprising commit actions previous to the first tag element associated with the change data, according to an embodiment herein. On receiving the delta_lines variable containing all lines modified or deleted in all files modified, renamed, or deleted between the "start_tag" and the "end_tag" from the "compute delta lines" module, the impact analysis engine calls the "get relevant commits" module as disclosed in the detailed description of FIG. 2. The "get relevant commits" module finds all scan_depth commits after "scan_depth_time" and before "start_tag" that touched a given line. The "get relevant commits" module receives the lines touched between "start_tag" and "end_tag" as an input from the "compute delta lines" module and returns commits that also touched the same lines in accordance with the following algorithm:

(1) Initialize context:

(1.1) Initialize a "relevant_commits" variable as an array of commit information.

(1.2) Initialize a "commit_id" variable with start_tag.

(1.3) Set a "line_number" variable set to the current line number being processed.

(1.4) Set a "line_operation" to operation (added, modified, or deleted) performed on the current line being processed.

(2) For scan_depth times, starting from start_tag, scan commits in a backward direction that touched line "line_number" to fetch scan_depth commits and artifacts against which these commits were performed.

(2.1) Find a parent commit before commit_id that touched line line_number in file F. This is performed using a blame or annotate-like command. The annotate-like command outputs a previous commit identifier (id) that touched line number in line_number in file F. The previous commit identifier is addressed as the parent commit in source control management (SCM) terminology.

(2.2) Fetch commit information or details of the parent commit using an SCM log or show command and fetch commit comments/messages or the linked artifact identifier (if artifacts are in the same system as the repository and the work item is traced to a commit itself).

(2.3) From the commit log output from step 2.2, parse and fetch the time of commit. If the time of commit is before "scan_depth_time" then break this iteration and proceed with analysis of next line.

(2.4) Add commit information such as commit id, commit message, commit time, committer, and author to the "relevant_commits" variable.

(2.5) Break iteration on this line if the line was added in a parent commit. Execution of the blame or annotate-like command at (2.1) outputs information on whether the line was added in a parent commit.

(2.6) Execute a git-show command on the parent commit to view whether the file was created in that version; if yes, then break the iteration.

(2.7) Prior to the next iteration on line_number, fetch position of the line where the line was in the parent commit to avoid incorrect results when executing an annotate-like command in the next iteration. For that, execute a git diff command between commit_id and the parent commit to obtain the previous line number of line_number. Parse diff response to obtain the old line number. Replace line_number with the previous line number retrieved.

(2.8) Replace commit_id with the identifier of the parent commit and proceed to step (2.1).

(3) Return the "relevant_commits" variable.

As illustrated in FIGS. 4A-4B, the "get relevant commits" module receives 401 scan_depth, scan_depth_time, start_tag, line number, and line operation of the line currently in iteration as an input from the user input data. The "get relevant commits" module initializes 402 the "relevant_commits" variable as a list configured to store commit information, commit_id with start_tag, line_number to line number, and line_operation to line operation. For scan_depth times, starting from start_tag, the "get relevant commits" module iterates 403 and scans commits in a backward direction that touched line "line number" to fetch scan_depth commits and artifacts against which these commits were performed. The "get relevant commits" module identifies 404 a parent commit before commit_id that touched line_number. The "get relevant commits" module fetches 405 commit time, commit message of the parent commit using a log or show-like command. The "get relevant commits" module determines 406 whether the commit time is before the scan_depth_time. If the commit time is before the scan_depth_time, the "get relevant commits" module proceeds to step 409. If the commit time is not before the scan_depth_time, the "get relevant commits" module adds 407 commit information to the "relevant_commits" variable. The "get relevant commits" module determines 408 whether the line is added in the parent commit. If the line is added in the parent commit, the "get relevant commits" module proceeds to step 409. If the line is not added in the parent commit, the "get relevant commits" module executes 410 an SCM show command on the parent commit to fetch the operation performed on the file. The "get relevant commits" module determines 411 whether the file was added in the parent commit. If the file was added in the parent commit, the "get relevant commits" module proceeds to step 409. If the file was not added in the parent commit, the "get relevant commits" module fetches 412 the old line number of line_number by executing an SCM diff command between the file content in commit_id and its parent commit. The "get relevant commits" module replaces 413 commit_id with the id of the parent commit and line_number with the old line number and continues with the next iteration 403. After the iterations for scan_depth times are complete, at step 409, the "get relevant commits" module returns the "relevant_commits" variable containing all scan_depth commits after "scan_depth_time" and before "start_tag" that touched a given line.

FIG. 5 illustrates a flowchart of a computer-implemented method for retrieving data sets comprising artifacts traced to the commit actions and detailed information of the identified artifacts, according to an embodiment herein. On receiving the "relevant_commits" variable containing all scan_depth commits after "scan_depth_time" and before "start_tag" that touched a given line from the "get relevant commits" module, the impact analysis engine calls the "get artifacts data" module as disclosed in the detailed description of FIG. 2. The "get artifacts data" module receives the commits that touched the same line as touched between the start_tag and the end_tag, parses each commit to fetch artifact identifiers (ids) against which the commit was performed, and returns detailed information of the artifacts identified by the artifact identifiers from another data source, for example, an application lifecycle management (ALM) system in accordance with the following algorithm:

(1) Initialize an "artifacts_impacted" variable as an array, with each element configured to store artifact information.
(2) Iterate through all commits in the "relevant_commits" variable.
  (2.1) Parse artifact id(s) from commit messages or fetch the artifact id from the traced artifact id(s) or from a traced pull request.
  (2.2) For the fetched artifact id, fetch artifact_type such as story, feature, defect, etc., parent artifact id, and parent artifact type from the ALM system. This artifact information is fetched from an application programming interface (API) or directly from an ALM system database.
  (2.3) Add artifact information such as artifact id, artifact type, parent artifact id, and any other information requested by a user wants to the "artifacts_impacted" variable.
(3) Return the "artifacts_impacted" variable.

As illustrated in FIG. 5, the "get artifacts data" module receives 501 the relevant commits impacted from the "get relevant commits" module. The "get artifacts data" module initializes 502 an "artifacts_impacted" variable as a list configured to store artifact information. The "get artifacts data" module processes 503 all commits from index 1 till size of relevant commits. For each commit, the "get artifacts data" module parses 504 a commit message to match an artifact id regular expression (regex), traverses artifacts traced to commit or pull or merge request, and fetches the artifact identifier "artifact_id". The "get artifacts data" module then fetches 505 artifact information from the ALM system using the artifact_id. The "get artifacts data" module adds 506 the artifact information to the "artifacts_impacted" variable. After the iterations 503 are complete, the "get artifacts data" module returns 507 the "artifacts_impacted" variable containing the artifacts impacted by changes to each line of the software code and detailed information of each of the impacted artifacts.

FIG. 6 illustrates a flowchart of a computer-implemented method for retrieving a data set comprising detailed information of linked elements, for example, tests, traced to the identified artifacts, according to an embodiment herein. On receiving the "artifacts_impacted" variable containing the artifacts impacted by changes to each line of the software code and detailed information of each of the impacted artifacts from the "get artifacts data" module, the impact analysis engine calls the "get test data" module as disclosed in the detailed description of FIG. 2. The "get test data" module receives the list of artifacts and returns linked test information in accordance with the following algorithm:

(1) initialize a "regression_tests" variable as an array, with each element configured to store test information.
(2) Iterate through all artifacts in the "artifacts_impacted" variable.
  (2.1) Fetch tests traced to a given artifact from a quality assurance (QA) system.
  (2.2) Add test information such as test identifier (id), test name, test status, and any other information requested by a user to the "regression_tests" variable.
(3) Return the "regression_tests" variable.

As illustrated in FIG. 6, the "get test data" module receives 601 artifacts impacted from the "get artifacts data" module. The "get test data" module initializes 602 a "regression_tests" variable as a list configured to store test information. The "get test data" module iterates 603 all impacted artifacts from index 1 till size of impacted artifacts. The "get test data" module fetches 604 tests traced to each artifact identifier (artifact_id) from the QA system. The "get test data" module adds 605 test information such as test identifier (id), test name, status, etc., to the "regression_tests" variable. After the iterations 603 are complete, the "get test data" module returns 606 the "regression_tests" variable containing the tests traced to the identified artifacts and detailed information of each of the tests.

The impact analysis engine is fully extensible as availability of the artifact identifiers allows an end user to fetch any data from the ALM system or the QA system and adjust data viewable on the impacted artifacts. In an embodiment, the impact analysis engine operates with testing models, where tests are written against each story or defect or any other artifact type or where tests are written against a parent artifact such as a feature or an epic. The impact analysis engine provides flexibility such that, depending on how artifacts are structured in the ALM system, the impact analysis engine allows a user to obtain features impacted from the "artifacts_impacted" variable by viewing only parent artifacts, obtain all defects that are impacted, all epics that are impacted, etc. Similarly, the impact analysis engine allows users to obtain story level test details from the "artifacts_impacted" and "regression_tests" variables or roll up information of the tests to determine all tests traced to a feature level or a defect level. In an embodiment, the impact analysis engine fetches additional artifact information comprising, for example, assignee, area path, team, release, sprint, etc., from the ALM system. The impact analysis engine further rolls up the "artifacts_impacted" variable to include teams, releases, sprints, etc., such that a user can also view which release is most impacted and can then fetch a test plan at a release level. The impact analysis engine is configured to operate with any data source, for example, any SCM system, any ALM system, any QA system, or any other tool or data source. In an embodiment, the impact analysis engine is configured to store all information retrieved from various data sources, for example, in a relational or non-relational database, thereby minimizing data extraction calls to an end system, for example, an SCM system, an ALM system, a QA system, etc., and increasing the speed of the system disclosed herein. In another embodiment, the impact analysis engine is configured to allow marking of impacted artifacts directly in the ALM system or impacted tests in the QA system.

Figure 7:
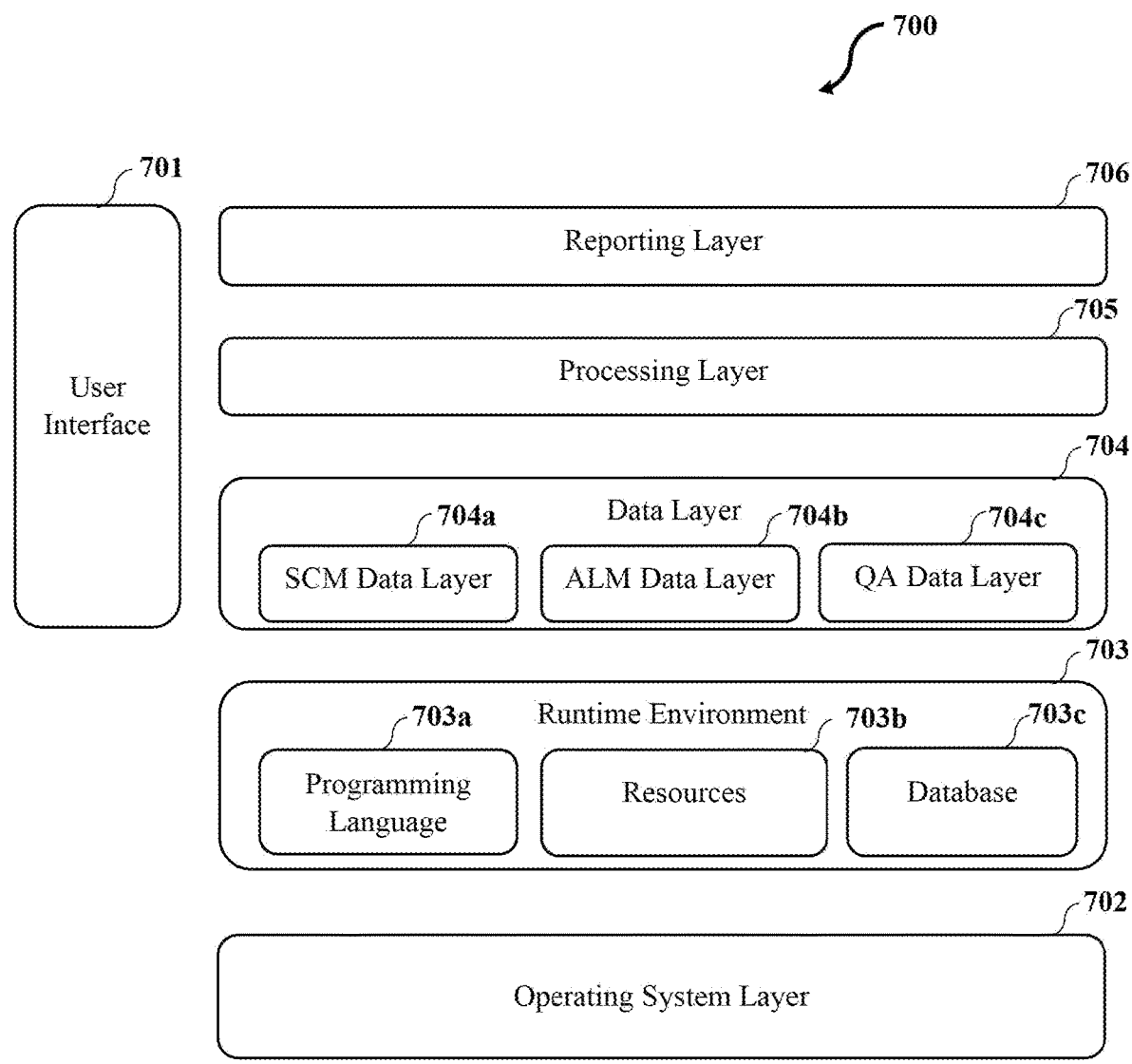
FIG. 7 illustrates an architectural block diagram of a system for comprehensively analyzing impact of changes to a software code, according to an embodiment herein.

FIG. 7 illustrates an architectural block diagram of a system 700 for the comprehensively analyzing impact of changes to a software code, according to an embodiment herein. In an exemplary implementation, the architecture of the system 700 disclosed herein comprises an operating system layer 702, a runtime environment 703, a data layer 704, a processing layer 705, a reporting layer 706, and an input channel, for example, a user interface 701 as illustrated in FIG. 7. In an embodiment, the impact analysis engine of the system 700 disclosed herein encompasses the data layer 704, the processing layer 705, and the reporting layer 706, and operates using the operating system layer 702 and the runtime environment 703. In an embodiment, the impact analysis engine renders the user interface 701 on a display unit of a user's computing device. The user, via the user interface 701, inputs a version of a software code on which a deep impact analysis or a regression test is to be performed. The user may also enter a depth for the impact analysis and an indication of the data the user wants to view via the user interface 701. In another embodiment, the impact analysis engine receives the user input data comprising, for example, the version of the software code, the depth for the impact analysis, the indication of the data the user wants to view, etc., via other input channels, for example, a script, an application programming interface (API), etc.

At the operating system layer 702, the impact analysis engine is configured to run on any operating system, for example, the Windows® operating system of Microsoft Corporation, the Red Hat® Enterprise Linux® operating system, the Solaris® developed by Sun Microsystems Inc, etc. The operating system layer 702 shares the impact analysis engine with other data sources, for example, source control management (SCM) systems, application lifecycle management (ALM) systems, quality assurance (QA) systems, etc., without requiring any additional configuration to be performed in the system 700. The impact analysis engine is programmable in any programming language 703a, for example, Java®, Python®, .NET, etc., and is executable in a corresponding runtime environment 703. The impact analysis engine is operably coupled to multiple resources 703b of the runtime environment 703 for retrieving code change data from the data sources, for example, the SCM systems, the ALM systems, the QA systems, etc. The resources 703b comprise, for example, application programming interfaces (APis), web services, command (CMD) line tools, simple object access protocols (SOAPs), etc. In an optional embodiment, the runtime environment 703 comprises a database 703c, for example, a relational database or a non-relational database, for storing the retrieved code change data for efficient execution of the impact analysis on a software code.

The data layer 704 is configured for fetching required data from the data sources, for example, the SCM systems, the ALM systems, the QA systems, etc. In an embodiment, the data layer 704 comprises an SCM data layer 704a, an ALM data layer 704b, and a QA data layer 704c. The SCM data layer 704a extracts commit, file and line information from an SCM system, for example, using an end system software development kit (SDK). The ALM data layer 704b extracts artifact related information, for example, artifact release, team, area path, sprint, etc., from an ALM system, for example, using an SDK provided by the ALM system. The QA data layer 704c extracts tests related information, for example, tests associated with a given artifact, type of test, test plans, etc., from a QA system, for example, using an SDK provided by the QA system.

The processing layer 705 orchestrates the sending of user input data from the user interface 701 or another input channel to the data layer 704 for processing and coordinating data exchange between the SCM data layer 704a, the ALM data layer 704b, and the QA data layer 704c. The data layer 704 fetches the required code change data from the SCM system, the ALM system, and the QA system via the SCM data layer 704a, the ALM data layer 704b, and the QA data layer 704c respectively, and then sends the code change data to the reporting layer 706 for generating an impact analysis report. The reporting layer 706 generates the impact analysis report from the code change data shared by the processing layer 705 based on the user input data, the user's request, and user preferences.

Figure 8:
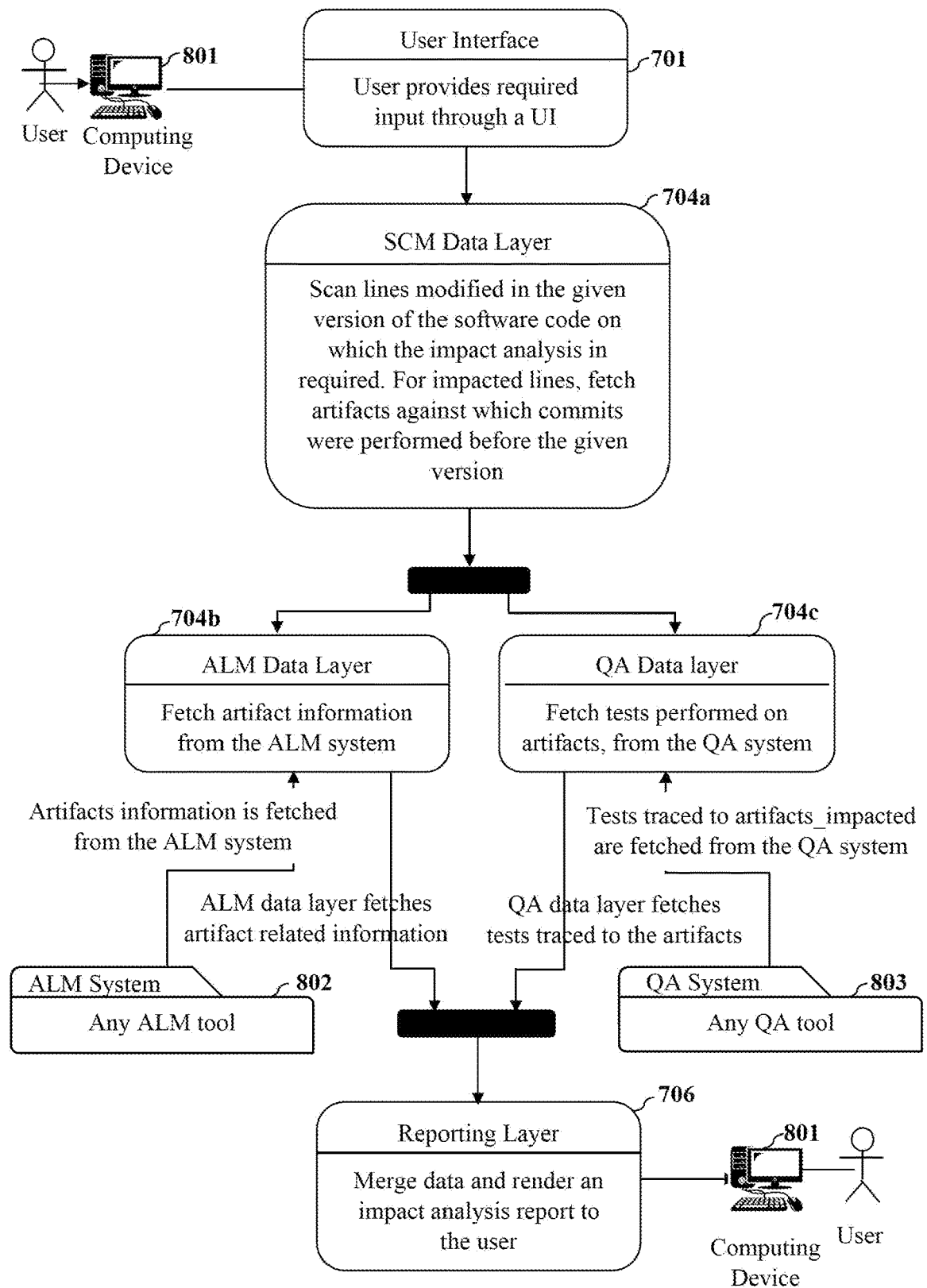
FIG. 8 illustrates a functional block diagram of a computer-implemented method for comprehensively analyzing impact of changes to a software code, according to an embodiment herein.

FIG. 8 illustrates a functional block diagram of a computer-implemented method for comprehensively analyzing impact of changes to a software code, according to an embodiment herein. As disclosed in the detailed description of FIG. 7, the impact analysis engine accesses a source control management (SCM) system via the SCM data layer 704a, an application lifecycle management (ALM) system 802 via the ALM data layer 704b, and a quality assurance (QA) system 803 via the QA data layer 704c. Moreover, a user accesses the SCM system via the SCM data layer 704a using a computing device 801. In an embodiment, the impact analysis engine renders a user interface 701 on the user's computing device 801 for receiving user input data comprising, for example, start_tag, end_tag, scan_depth, scan_depth_time, etc., to execute the impact analysis algorithm disclosed in the detailed descriptions of FIGS. 2-6. In another embodiment, the impact analysis engine receives the user input data via other input channels, for example, a script, an application programming interface (API), etc. The impact analysis engine passes the user input data to the SCM data layer 704a to extract artifacts impacted for a given version of a software code.

At the SCM data layer 704a, the impact analysis engine scans lines modified in the given version of the software code on which the impact analysis is required. For the impacted lines, the impact analysis engine fetches artifacts against which commits were performed before the given version of the software code. The impact analysis engine sends the impacted artifacts to the ALM data layer 704b and the QA data layer 704c for fetching artifacts and tests related information respectively. At the ALM data layer 704b, the impact analysis engine fetches artifact information and details from the ALM system 802. The ALM system 802 is an ALM tool, for example, Jira® of Atlassian Pvt. Ltd., Rally Software® of Broadcom Inc., Azure® DevOps of Microsoft Corporation, Digital.ai® Agility otDigital.ai Software, Inc., etc. At the QA data layer 704c, the impact analysis engine fetches tests traced to the impacted artifacts from the QA system 803. The QA system 803 is a QA tool, for example, the Micro Focus® ALM tool, Azure® test plans, qTest® developed by QASymphony LLC, etc. At the reporting layer 706, the impact analysis engine merges the data received from the ALM data layer 704b and the QA data layer 704c and generates an impact analysis report based on the user input. The impact analysis engine renders the impact analysis report on the computing device 801. The impact analysis engine renders the impact analysis report or the output results of the impact analysis via one or more output channels, for example, on the user interface 701, through a script, through an API call, on a spreadsheet, through a direct transfer to a database, etc.

Figure 9:
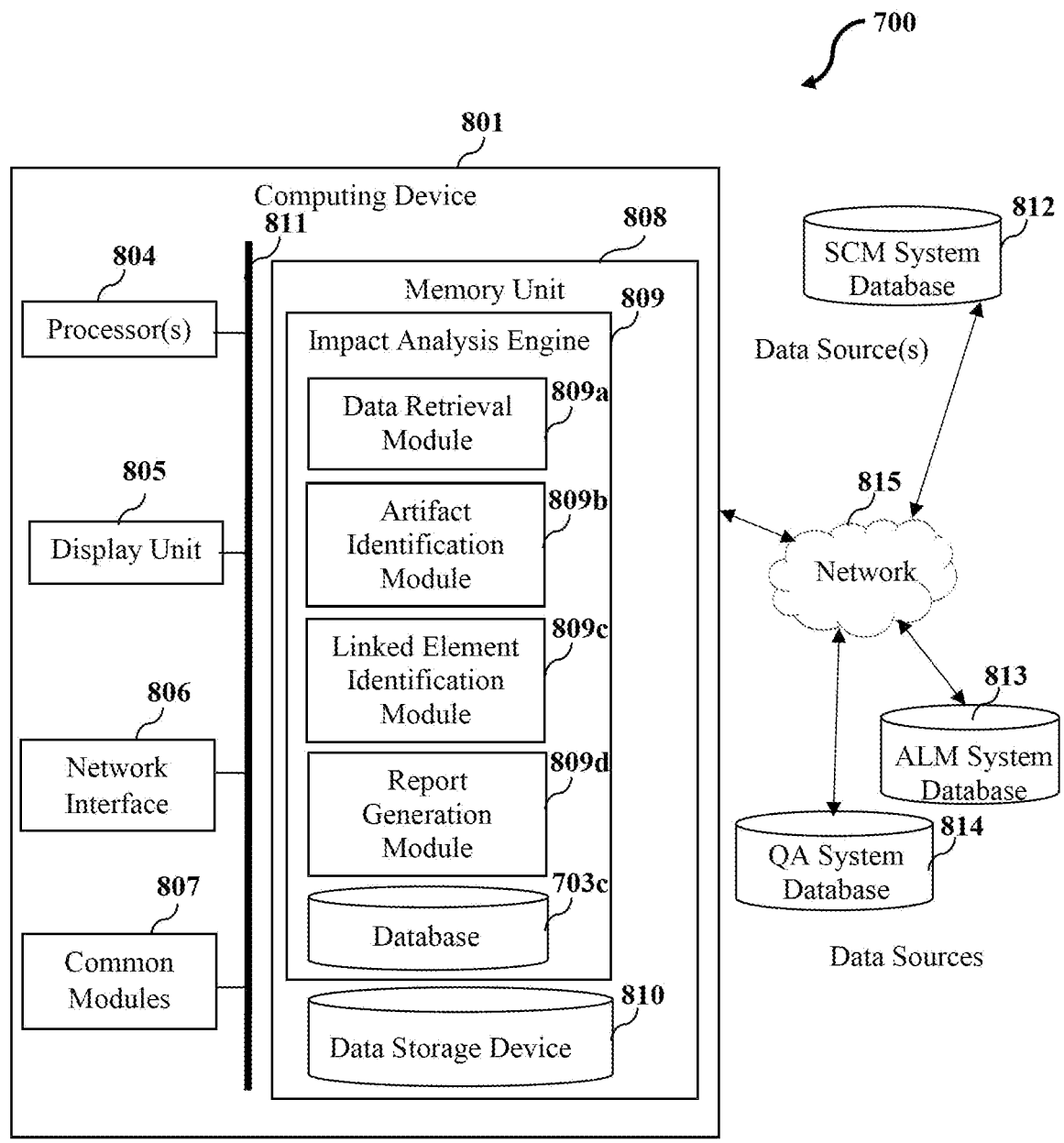
FIG. 9 illustrates an architectural block diagram of an exemplary implementation of the system comprising an impact analysis engine for comprehensively analyzing impact of changes to a software code, according to an embodiment herein.

FIG. 9 illustrates an architectural block diagram of an exemplary implementation of the system 700 comprising the impact analysis engine 809 for comprehensively analyzing impact of changes to a software code, according to an embodiment herein. In an embodiment, the impact analysis engine 809 is deployed in a computing device 801 as illustrated in FIG. 9. The computing device 801 is a computer system programmable using high-level computer programming languages. The computing device 801 is an electronic device, for example, one or more of a personal computer, a tablet computing device, a mobile computer, a mobile phone, a smart phone, a portable computing device, a laptop, a personal digital assistant, a wearable computing device such as smart glasses, a smart watch, etc., a touch centric device, a workstation, a client device, a portable electronic device, a network enabled computing device, an interactive network enabled communication device, an image capture device, any other suitable computing equipment, combinations of multiple pieces of computing equipment, etc. In an embodiment, the impact analysis engine 809 is implemented in the computing device 801 using programmed and purposeful hardware. In an embodiment, the impact analysis engine 809 is a computer-embeddable system that comprehensively analyzes the impact of changes to a software code.

The impact analysis engine 809 in the computing device 801 communicates with multiple data sources, for example, a source control management (SCM) system database 812, an application lifecycle management (ALM) system database 813, a quality assurance (QA) system database 814, etc., via a network 815, for example, a short-range network or a long-range network. The network 815 is, for example, one of the internet, an intranet, a wired network, a wireless network, a communication network that implements Bluetooth® of Bluetooth Sig, Inc., a network that implements Wi-Fi® of Wi-Fi Alliance Corporation, an ultra-wideband (UWB) communication network, a wireless universal serial bus (USB) communication network, a communication network that implements ZigBee® of ZigBee Alliance Corporation, a general packet radio service (GPRS) network, a mobile telecommunication network such as a global system for mobile (GSM) communications network, a code division multiple access (CDMA) network, a third generation (3G) mobile communication network, a fourth generation (4G) mobile communication network, a fifth generation (5G) mobile communication network, a long-term evolution (LTE) mobile communication network, a public telephone network, etc., a local area network, a wide area network, an internet connection network, an infrared communication network, etc., or a network formed from any combination of these networks. In another embodiment, the impact analysis engine 809 is implemented in a cloud computing environment. As used herein, "cloud computing environment" refers to a processing environment comprising configurable computing physical and logical resources, for example, networks, servers, storage media, virtual machines, applications, services, etc., and data distributed over the network 815. The cloud computing environment provides an on-demand network access to a shared pool of the configurable computing physical and logical resources. In an embodiment, the impact analysis engine 809 is a cloud computing-based platform implemented as a service for comprehensively analyzing impact of changes to a software code. In another embodiment, the impact analysis engine 809 is implemented as an on-premise platform comprising on-premise software installed and run on client systems on the premises of an organization.

As illustrated in FIG. 9, the computing device 801 comprises a non-transitory, computer-readable storage medium, for example, a memory unit 808 for storing computer program instructions defined by modules, for example, 809a, 809b, 809c, 809d, etc., of the impact analysis engine 809. As used herein, "non-transitory, computer-readable storage medium" refers to all computer-readable media that contain and store computer programs and data. Examples of the computer-readable media comprise hard drives, solid state drives, optical discs or magnetic disks, memory chips, a read-only memory (ROM), a register memory, a processor cache, a random-access memory (RAM), etc. The computing device 801 further comprises at least one processor 804 operably and communicatively coupled to the memory unit 808 for executing the computer program instructions defined by the modules, for example, 809a, 809b, 809c, 809d, etc., of the impact analysis engine 809. The memory unit 808 is used for storing program instructions, applications, and data. In an embodiment, the memory unit 808 is a random-access memory (RAM) or another type of dynamic storage device that stores information and instructions for execution by the processor 804. The memory unit 808 also stores temporary variables and other intermediate information used during execution of the instructions by the processor 804. In an embodiment, the computing device 801 further comprises a read only memory (ROM) or other types of static storage devices that store static information and instructions for execution by the processor 804. In an embodiment, the modules, for example, 809a, 809b, 809c, 809d, etc., of the impact analysis engine 809 are stored in the memory unit 808.

The processor 804 is configured to execute the computer program instructions defined by the modules, for example, 809a, 809b, 809c, 809d, etc., of the impact analysis engine 809 for comprehensively analyzing impact of changes to a software code. The modules, for example, 809a, 809b, 809c, 809d, etc., of the impact analysis engine 809, when loaded into the memory unit 808 and executed by the processor 804, transform the computing device 801 into a specially-programmed, special purpose computing device configured to implement the functionality disclosed herein. The processor 804 refers to any one or more microprocessors, central processing unit (CPU) devices, finite state machines, computers, microcontrollers, digital signal processors, logic, a logic device, an application specific integrated circuit (ASIC), a field-programmable gate array (FPGA), a chip, etc., or any combination thereof, capable of executing computer programs or a series of commands, instructions, or state transitions. In an embodiment, the processor 804 is implemented as a processor set comprising, for example, a programmed microprocessor and a math or graphics co-processor. The impact analysis engine 809 is not limited to employing the processor 804. In an embodiment, the impact analysis engine 809 employs a controller or a microcontroller. The processor 804 executes the modules, for example, 809a, 809b, 809c, 809d, etc., of the impact analysis engine 809.

As illustrated in FIG. 9, the computing device 801 further comprises a data bus 811, a display unit 805, a network interface 806, and common modules 807. The data bus 811 permits communications between the modules, for example, 804, 805, 806, 807, and 808 of the computing device 801. The display unit 805 displays information, images, display interfaces, user interface elements such as checkboxes, input text fields, etc., for example, for allowing a user to enter input data, for example, start_tag, end_tag, scan_depth, scan_depth_time, etc., for defining the scope of the impact analysis to be performed on a version of the software code, and for allowing the user to customize information to be displayed in an impact analysis report. In an embodiment, the impact analysis engine 809 renders an input channel, for example, a graphical user interface (GUI) on the display unit 805 for receiving inputs from the user. The GUI comprises, for example, an online web interface, a web-based downloadable application interface, a mobile-based downloadable application interface, etc. In another embodiment, the impact analysis engine 809 receives inputs from the user via other input channels, for example, a script, an application programming interface (API), etc.

The network interface 806 enables connection of the computing device 801 to the network 815. In an embodiment, the network interface 806 is provided as an interface card also referred to as a line card. The network interface 806 is, for example, one or more of infrared interfaces, interfaces implementing Wi-Fi® of Wi-Fi Alliance Corporation universal serial bus interfaces, FireWire® interfaces of Apple Inc., Ethernet interfaces, frame relay interfaces, cable interfaces, digital subscriber line interfaces, token ring interfaces, peripheral controller interconnect interfaces, local area network interfaces, wide area network interfaces, interfaces using serial protocols, interfaces using parallel protocols, Ethernet communication interfaces, asynchronous transfer mode interfaces, high speed serial interfaces, fiber distributed data interfaces, interfaces based on transmission control protocol (TCP)/internet protocol (IP), interfaces based on wireless communications technology such as satellite technology, radio frequency technology, near field communication, etc. The common modules 807 of the computing device 801 comprise, for example, input/output (I/O) controllers, input devices, output devices, fixed media drives such as hard drives, removable media drives for receiving removable media, etc. Computer applications and programs are used for operating the computing device 801. The programs are loaded onto fixed media drives and into the memory unit 808 via the removable media drives. In an embodiment, the computer applications and programs are loaded into the memory unit 808 directly via the network 815.

In an exemplary implementation illustrated in FIG. 9, the impact analysis engine 809 comprises a data retrieval module 809a, an artifact identification module 809b, a linked element identification module 809c, a report generation module 809d, and optionally a database 703c, stored in the memory unit 808 and executed by the processor 804 in the computing device 801. In this exemplary implementation, the data retrieval module 809a defines computer program instructions of the "compute delta lines" module and the "get relevant commits that touched delta lines" module disclosed in the detailed descriptions of FIGS. 3A-3B and FIGS. 4A-4B respectively; the artifact identification module 809b defines computer program instructions of the "get artifacts data" module disclosed in the detailed description of FIG. 5; and the linked element identification module 809c defines computer program instructions of the "get test data module" disclosed in the detailed description of FIG. 6.

The data retrieval module 809a retrieves code change data from at least one of the data sources, for example, 812. In an embodiment, the data retrieval module 809a retrieves the code change data from the data source 812 by automatic execution of one or more commands associated with the data source 812 as disclosed in the detailed descriptions of FIG. 1 and FIGS. 2-4B. In an embodiment, the data retrieval module 809a retrieves the code change data from the data source 812 based on user input data received via any input channel, for example, a GUI, a script, an API, etc. In an embodiment, the data retrieval module 809a stores the retrieved code change data in the database 703c, for example, a relational database or a non-relational database. The database 703c is any storage area or medium that can be used for storing data, images, and files. In an embodiment, the database 703c is any of a structured query language (SQL) database or a not only SQL (NoSQL) database. In an embodiment, the database 703c is a location on a file system. In another embodiment, the database 703c is configured to be remotely accessible by the impact analysis engine 809 in the computing device 801 via the network 815. In another embodiment, the database 703c is configured as a cloud-based database implemented in a cloud computing environment. In another embodiment, the data retrieval module 809a stores the retrieved code change data in another data storage device 810 in the memory unit 808 of the computing device 801.

The artifact identification module 809b automatically identifies multiple artifacts impacted by changes to each line of the software code across different versions of the software code by processing the retrieved code change data using another data source, for example, 813, as disclosed in the detailed description of FIG. 2 and FIG. 5. In an embodiment, the artifact identification module 809b processes the retrieved code change data by iteratively processing and comparing lines of the software code changed across the different versions of the software code for deriving the impact of the changes performed for a requested version of the software code. The linked element identification module 809c automatically identifies linked elements, for example, tests, features, epics, other linked artifacts, etc., traced to the identified artifacts using another data source, for example, 814, as disclosed in the detailed description of FIG. 2 and FIG. 6. The report generation module 809d generates and renders an impact analysis report comprising customizable information related to the identified artifacts and the identified linked elements at multiple levels on the computing device 801. The report generation module 809d renders the impact analysis report via one or more output channels, for example, a GUI, a script, an API call, a spreadsheet, etc. In an embodiment, the report generation module 809d groups and renders the customizable information related to the identified artifacts and the identified linked elements at multiple levels by configurable fields on an output channel, for example, a GUI, a spreadsheet, etc., as disclosed in the detailed description of FIGS. 10E-10H. The processor 804 retrieves instructions defined by the data retrieval module 809a, the artifact identification module 809b, the linked element identification module 809c, and the report generation module 809d of the impact analysis engine 809 from the memory unit 808 for performing respective functions disclosed above.

The data retrieval module 809a, the artifact identification module 809b, the linked element identification module 809c, and the report generation module 809d of the impact analysis engine 809 are disclosed above as software executed by the processor 804. In an embodiment, the modules, for example, 809a, 809b, 809c, 809d, etc., of the impact analysis engine 809 are implemented completely in hardware. In another embodiment, the modules, for example, 809a, 809b, 809c, 809d, etc., of the impact analysis engine 809 are implemented by logic circuits to carry out their respective functions disclosed above. In another embodiment, the impact analysis engine 809 is also implemented as a combination of hardware and software and one or more processors, for example, 804, that are used to implement the modules, for example, 809a, 8091, 809c, 809d, etc., of the impact analysis engine 809.

For purposes of illustration, the detailed description refers to the modules, for example, 809a, 809b, 809c, 809d, etc., of the impact analysis engine 809 being run locally on a single computing device 801; however the scope of the system 700 and the method disclosed herein is not limited to the modules, for example, 809a, 809b, 809c, 809d, etc., of the impact analysis engine 809 being run locally on a single computing device 801 via the operating system and the processor 804, but may be extended to run remotely over the network 815 by employing a web browser and a remote server, a mobile phone, or other electronic devices. In an embodiment, one or more portions of the system 700 disclosed herein are distributed across one or more computer systems (not shown) coupled to the network 815.

The non-transitory, computer-readable storage medium disclosed herein stores computer program instructions executable by the processor 804 for comprehensively analyzing impact of changes to a software code. The computer program instructions implement the processes of various embodiments disclosed above and perform additional steps that may be required and contemplated for comprehensively analyzing impact of changes to a software code. When the computer program instructions are executed by the processor 804, the computer program instructions cause the processor 804 to perform the steps of the method for comprehensively analyzing impact of changes to a software code as disclosed in the detailed descriptions of FIGS. 1-8. In an embodiment, a single piece of computer program code comprising computer program instructions performs one or more steps of the method disclosed in the detailed descriptions of FIGS. 1-8. The processor 804 retrieves these computer program instructions and executes them.

A module, or an engine, or a unit, as used herein, refers to any combination of hardware, software, and/or firmware. As an example, a module, or an engine, or a unit includes hardware, such as a microcontroller, associated with a non-transitory, computer-readable storage medium to store computer program codes adapted to be executed by the microcontroller. Therefore, references to a module, or an engine, or a unit, in an embodiment, refer to the hardware that is specifically configured to recognize and/or execute the computer program codes to be held on a non-transitory, computer-readable storage medium. In an embodiment, the computer program codes comprising computer readable and executable instructions are implemented in any programming language, for example, C, C++, C#, Java®, JavaScript®, Fortran, Ruby, Perl®, Python®, Angular™ of Google LLC, React™ of Facebook, Inc., Visual Basic®, hypertext preprocessor (PHP), Microsoft® .NET, Objective-C®, etc. In another embodiment, other object-oriented, functional, scripting, and/or logical programming languages are also used. In an embodiment, the computer program codes or software programs are stored on or in one or more mediums as object code. In another embodiment, the term "module" or "engine" or "unit" refers to the combination of the microcontroller and the non-transitory, computer-readable storage medium. Often module or engine or unit boundaries that are illustrated as separate commonly vary and potentially overlap. For example, a module or an engine or a unit may share hardware, software, firmware, or a combination thereof, while potentially retaining some independent hardware, software, or firmware. In vinous embodiments, a module or an engine or a unit includes any suitable logic.

FIGS. 10A-10H illustrate exemplary screenshots showing input data received and output data rendered by the impact analysis engine during a comprehensive analysis of impact of changes to a software code, according to an embodiment herein. Consider an example where a user invokes the impact analysis engine on a computing device, for example, a workstation, for comprehensively analyzing impact of changes to a software code. The impact analysis engine performs a deep impact analysis based on lines changed by different artifacts and automatically identifies impacted artifacts, without any manual intervention. The impact analysis engine collects data from multiple data sources, for example, source control management (SCM) systems, application lifecycle management (ALM) systems, quality assurance (QA) systems, etc. The impact analysis engine processes the collected data to generate a list of impacted artifacts and tests that need to be performed for those artifacts. In an embodiment, the impact analysis engine renders an input channel, for example, a GUI 1001 on the computing device for allowing the user to enter input data, for example, a start tag, an end tag, a scan depth, a scan depth time, etc., as exemplarily illustrated in FIG. 10A. In another embodiment, the impact analysis engine receives the user input data through other input channels, for example, a script, an application programming interface (API), etc. The user input data defines the scope for retrieving code change data from one or more data sources. On receiving the user input data, the impact analysis engine identifies files changed between the start tag and the end tag input by the user. In an embodiment, the impact analysis engine identifies all files touched and operations, for example, added, renamed, modified, deleted, etc., performed on each file between the start tag and the end tag, for example, from an SCM system using a git diff equivalent command. The impact analysis engine outputs a list of files touched between the start tag and the end tag on an output channel 1002 as exemplarily illustrated in FIG. 10B. The impact analysis engine then identifies lines touched for each of the files changed between the start tag and the end tag. The impact analysis engine outputs the list of all lines touched, along with the old line number and the new line number for each line on an output channel 1003 as exemplarily illustrated in FIG. 10C. Once the touched lines are identified, the impact analysis engine fetches commits before the start tag by executing a command, for example, "$ git blame start_tag;\—somefile.js#", to obtain commits that also changed the same line. The impact analysis engine outputs the following commits:

9ec30f4228d (Someone Else 2016-11-01 10:48:22+ 1000 15)

9ec30f4228d (Someone Else 2016-11-01 10:48:22+ 1000 16)

where 9ec30f4228d is a previous commit on line 15 that touched that line.

For old commits that touched the same lines as those touched between the start tag and the end tag, the impact analysis engine fetches artifacts against which that commit was performed. A sample commit message is disclosed below:

Committing for SAMP-100, made changes in login method where "Samp-100" is an artifact identifier extracted by regular expression (regex) parsmg.

The impact analysis engine generates and renders a list 1004 of impacted artifacts in a pattern on an output channel, for example, a spreadsheet, as exemplarily illustrated in FIG. 10D. From the list 1004 of impacted artifacts displayed on the output channel, the impact analysis engine allows the user to fetch any required information from other data sources, for example, an ALM system and a QA system to generate an impact analysis report. For example, the impact analysis engine identifies linked elements, for example, test cases that are traced to the artifacts that are impacted by the code changes in a release. The impact analysis engine allows the user to group artifacts or tests by various fields, for example, release, sprint, teams, artifact type, etc. The impact analysis engine groups and renders customizable information related to the identified artifacts and the identified tests at multiple levels by configurable fields on the computing device as exemplarily illustrated in FIGS. 10E-10H. For example, the impact analysis engine generates an impact analysis report 1005 comprising a list of regression tests grouped by impacted artifacts as exemplarily illustrated in FIG. 10E. In another example, the impact analysis engine generates an impact analysis report 1006 comprising a list of regression tests grouped by "caused by artifacts" as exemplarily illustrated in FIG. 10F. In another example, the impact analysis engine generates an impact analysis report 1007 comprising a list of impacted artifacts by release as exemplarily illustrated in FIG. 10G. In another example, the impact analysis engine generates an impact analysis report 1008 comprising a list of impacted tests by artifact type as exemplarily illustrated in FIG. 10H. The impact analysis engine renders the generated impact analysis reports on the computing device via one or more output channels, for example, a GUI, a spreadsheet, a direct database transfer, etc.

The impact analysis engine reports old artifacts that are impacted as a result of changes performed between two versions of a software code, without manual intervention. In addition to scanning common files changed between two versions, the impact analysis engine scans each file at an additional level, that is, till a line level of the software code by scanning past commits to identify which artifacts' commits changed the same lines as changed in the version for which the impact analysis needs to be performed. The impact analysis engine removes noise and helps users to uncover actual impacted features or other artifacts.

It is apparent in different embodiments that the various methods, algorithms, and computer-readable programs disclosed herein are implemented on non-transitory, computer-readable storage media appropriately programmed for computing devices. The non-transitory, computer-readable storage media participate in providing data, for example, instructions that are read by a computer, a processor, or a similar device. In different embodiments, the "non-transitory, computer-readable storage media" also refer to a single medium or multiple media, for example, a centralized database, a distributed database, and/or associated caches and servers that store one or more sets of instructions that are read by a computer, a processor, or a similar device. The "non-transitory, computer-readable storage media" also refer to any medium capable of storing or encoding a set of instructions for execution by a computer, a processor, or a similar device and that causes a computer, a processor, or a similar device to perform any one or more of the steps of the method disclosed herein. In an embodiment, the computer programs that implement the methods and algorithms disclosed herein are stored and transmitted using a variety of media, for example, the computer-readable media in various manners. In an embodiment, hard-wired circuitry or custom hardware is used in place of, or in combination with, software instructions for implementing the processes of various embodiments. Therefore, the embodiments are not limited to any specific combination of hardware and software. In another embodiment, various aspects of the system and the method disclosed herein are implemented in a non-programmed environment comprising documents created, for example, in a hypertext markup language (HTML), an extensible markup language (XML), or other format that render aspects of a user interface or perform other functions, when viewed in a visual area or a window of a browser program. In another embodiment, various aspects of the system and the method disclosed herein are implemented as programmed elements, or non-programmed elements, or any suitable combination thereof.

Where databases are described such as the database 703c, the SCM system database 812, the ALM system database 813, and the QA system database 814 illustrated in FIG. 9, it will be understood by one of ordinary skill in the art that (i) alternative database structures to those described may be employed, and (ii) other memory structures besides databases may be employed. Any illustrations or descriptions of any sample databases disclosed herein are illustrative arrangements for stored representations of information. In an embodiment, any number of other arrangements are employed besides those suggested by tables illustrated in the drawings or elsewhere. Similarly, any illustrated entries of the databases represent exemplary information only; one of ordinary skill in the art will understand that the number and content of the entries can be different from those disclosed herein. In another embodiment, despite any depiction of the databases as tables, other formats including relational databases, object-based models, and/or distributed databases are used to store and manipulate the data types disclosed herein. In an embodiment, object methods or behaviors of a database are used to implement various processes such as those disclosed herein. In another embodiment, the databases are, in a known manner, stored locally or remotely from a device that accesses data in such a database. In embodiments where there are multiple databases, the databases are integrated to communicate with each other for enabling simultaneous updates of data linked across the databases, when there are any updates to the data in one of the databases.

The embodiments disclosed herein are configured to operate in a network environment comprising one or more computers that are in communication with one or more devices via a network. In an embodiment, the computers communicate with the devices directly or indirectly, via a wired medium or a wireless medium such as the Internet, a local area network (LAN), a wide area network (WAN) or the Ethernet, a token ring, or via any appropriate communications mediums or combination of communications mediums. Each of the devices comprises processors that are adapted to communicate with the computers. In an embodiment, each of the computers is equipped with a network communication device, for example, a network interface card, a modem, or other network connection device suitable for connecting to a network. Each of the computers and the devices executes an operating system. While the operating system may differ depending on the type of computer, the operating system provides the appropriate communications protocols to establish communication links with the network. Any number and type of machines may be in communication with the computers. The embodiments disclosed herein are not limited to a particular computer system platform, processor, operating system, or network.

The embodiments disclosed herein are not limited to a particular computer system platform, processor, operating system, or network. One or more of the embodiments disclosed herein are distributed among one or more computer systems, for example, servers configured to provide one or more services to one or more client computers, or to perform a complete task in a distributed system. For example, one or more of embodiments disclosed herein are performed on a client-server system that comprises components distributed among one or more server systems that perform multiple functions according to various embodiments. These components comprise, for example, executable, intermediate, or interpreted code, which communicate over a network using a communication protocol. The embodiments disclosed herein are not limited to be executable on any particular system or group of systems, and are not limited to any particular distributed architecture, network, or communication protocol.

The foregoing examples and illustrative implementations of various embodiments have been provided merely for explanation and are in no way to be construed as limiting of the embodiments disclosed herein. While the embodiments have been described with reference to various illustrative implementations, drawings, and techniques, it is understood that the words, which have been used herein, are words of description and illustration, rather than words of limitation. Furthermore, although the embodiments have been described herein with reference to particular means, materials, techniques, and implementations, the embodiments herein are not intended to be limited to the particulars disclosed herein; rather, the embodiments extend to all functionally equivalent structures, methods and uses, such as are within the scope of the appended claims. It will be understood by those skilled in the art, having the benefit of the teachings of this specification, that the embodiments disclosed herein are capable of modifications and other embodiments may be executed and changes may be made thereto, without departing from the scope and spirit of the embodiments disclosed herein.

What is claimed is:

1. A system for analyzing impact of changes to a software code, the system comprising:
    at least one processor;
    a non-transitory, computer-readable storage medium operably and communicatively coupled to the at least one processor and configured to store computer program instructions executable by the at least one processor; and
    an impact analysis engine configured to define the computer program instructions, which when executed by the at least one processor, cause the at least one processor to:
        retrieve code change data from at least one of a plurality of data sources;
        automatically identify a plurality of artifacts impacted by changes to each line of the software code across different versions of the software code by processing the retrieved code change data using another one of the plurality of data sources;
        automatically identify a plurality of linked elements traced to the identified artifacts using linkage information retrieved from another one of the plurality of data sources; and
        generate and render an impact analysis report comprising customizable information related to the identified artifacts and the identified linked elements at a plurality of levels on a computing device, and wherein the customizable information related to the identified artifacts and the identified linked elements is grouped and rendered at the plurality of levels by configurable fields on the computing device;
        wherein the retrieved code change data further comprises unique identifiers of the artifacts traced to commit actions, and wherein the unique identifiers are configured to allow customized retrieval of one or more artifact data sets comprising detailed information of the artifacts, from another one of the data sources.

2. The system of claim 1, wherein the linked elements comprise tests, features, epics, and linked artifacts traced to the identified artifacts.

3. The system of claim 1, wherein the plurality of data sources comprises one or more of source control management systems, application lifecycle management systems, quality assurance systems, and requirements management systems.

4. The system of claim 1, wherein the retrieved code change data comprises (a) a change data between a first tag element and a second tag element of the software code, and (b) commit actions previous to the first tag element associated with the change data.

5. The system of claim 4, wherein the detailed information of the artifacts comprises features, defects, and epics impacted by the changes to the each line of the software code.

6. The system of claim 1, wherein the code change data is retrieved from the at least one of the plurality of data sources by automatic execution of one or more commands associated with the at least one of the data sources.

7. The system of claim 1, wherein the processing of the retrieved code change data comprises iteratively processing and comparing lines of the software code changed across the different versions of the software code for deriving the impact of the changes performed for a requested version of the software code.

8. The system of claim 1, wherein the impact analysis engine is configured to define additional computer program instructions, which when executed by the at least one processor, cause the at least one processor to receive user input data via one or more of a plurality of input channels on the computing device, wherein the user input data defines a scope for the retrieval of the code change data from the at least one of the plurality of data sources, and wherein the user input data comprises a start tag element, an end tag element, a depth element, and a time element.

9. He system of claim 1, wherein the impact analysis engine is configured to define additional computer program instructions, which when executed by the at least one processor, cause the at least one processor to store the retrieved code change data, one or more artifact data sets corresponding to the identified artifacts, and one or more linked element data sets corresponding to linked elements traced to the identified artifacts in one of a database and the non-transitory, computer-readable storage medium.

10. A computer-implemented method comprises instructions stored on a non-transitory computer storage medium and run on a hardware process for analyzing impact of changes to a software code through one or more applications or algorithms, the method comprising steps of:
    retrieving code change data from at least one of a plurality of data sources by an impact analysis engine;
    automatically identifying a plurality of artifacts impacted by changes to each line of the software code across different versions of the software code, by the impact analysis engine, by processing the retrieved code change data using another one of the plurality of data sources;

automatically identifying a plurality of linked elements traced to the identified artifacts by the impact analysis engine using linkage information retrieved from another one of the plurality of data sources; and generating and rendering an impact analysis report comprising customizable information related to the identified artifacts and the identified linked elements at a plurality of levels on a computing device, and wherein the customizable information related to the identified artifacts and the identified linked elements is grouped and rendered at the plurality of levels by configurable fields on the computing device;

wherein the retrieved code change data further comprises unique identifiers of the artifacts traced to commit actions, and wherein the unique identifiers are configured to allow customized retrieval of one or more artifact data sets comprising detailed information of the artifacts, from another one of the data sources.

11. The computer-implemented method of claim 10, wherein the linked elements comprise tests, features, epics, and linked artifacts traced to the identified artifacts.

12. The computer-implemented method of claim 10, wherein the plurality of data sources comprises one or more of source control management systems, application lifecycle management systems, quality assurance systems, and requirements management systems.

13. The computer-implemented method of claim 10, wherein the retrieved code change comprises (a) a change data between a first tag element and a second tag element of the software code, and (b) commit actions previous to the first tag element associated with the change data.

14. The computer-implemented method of claim 13, wherein the detailed information of the artifacts comprises features, defects, and epics impacted by the changes to the each line of the software code.

15. The computer-implemented method of claim 10, wherein the code change data is retrieved from the at least one of the data sources by automatic execution of one or more commands associated with the at least one of the plurality of data sources.

16. The computer-implemented method of claim 10, wherein the processing of the retrieved code change data comprises iteratively processing and comparing lines of the software code changed across the different versions of the software code by the impact analysis engine for deriving the impact of the changes performed for a requested version of the software code.

17. The computer-implemented method of claim 10, further comprises receiving user input data via one or more of a plurality of input channels on the computing device by the impact analysis engine, wherein the user input data defines a scope for the retrieval of the code change data from the at least one of the plurality of data sources, and wherein the user input data comprises a start tag element, an end tag element, a depth element, and a time element.

18. The computer-implemented method of claim 10, further comprises storing the retrieved code change data, one or more artifact data sets corresponding to the identified artifacts, and one or more linked element data sets corresponding to linked elements traced to the identified artifacts in one of a database and a memory unit by the impact analysis engine.

* * * * *